(12) United States Patent
Wu et al.

(10) Patent No.: US 12,348,287 B2
(45) Date of Patent: Jul. 1, 2025

(54) PROCEDURES FOR DIFFERENTIAL CHANNEL STATE INFORMATION (CSI) REPORTING

(71) Applicant: QUALCOMM Incorporated, San Diego, CA (US)

(72) Inventors: Liangming Wu, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 16/608,027

(22) PCT Filed: May 4, 2018

(86) PCT No.: PCT/CN2018/085612
§ 371 (c)(1),
(2) Date: Oct. 24, 2019

(87) PCT Pub. No.: WO2018/202134
PCT Pub. Date: Nov. 8, 2018

(65) Prior Publication Data
US 2020/0059282 A1 Feb. 20, 2020

(30) Foreign Application Priority Data
May 5, 2017 (WO) ................ PCT/CN2017/083220

(51) Int. Cl.
*H04B 7/06* (2006.01)
*H04B 7/0413* (2017.01)
(Continued)

(52) U.S. Cl.
CPC ......... *H04B 7/0626* (2013.01); *H04B 7/0413* (2013.01); *H04L 1/0026* (2013.01); *H04W 72/04* (2013.01)

(58) Field of Classification Search
CPC .. H04B 7/0626; H04B 7/0413; H04B 7/0641; H04B 7/0478; H04L 1/0026;
(Continued)

(56) References Cited

U.S. PATENT DOCUMENTS 8,781,005 B2 7/2014 Mallik et al.
9,112,741 B2 * 8/2015 Breit .................... H04L 25/0222
(Continued)

FOREIGN PATENT DOCUMENTS

AU 2016202549 A1 5/2016
CN 103166734 A 6/2013
(Continued)

OTHER PUBLICATIONS

Qualcomm, "Discussion on Hybrid CSI-RS based Operation for eFD-MIMO", May 23-27, 2016, 3GPP TSG-RAN WG1 #85 R1-164431 (Year: 2016).*

(Continued)

*Primary Examiner* — Chuong M Nguyen
(74) *Attorney, Agent, or Firm* — QUALCOMM Incorporated

(57) ABSTRACT

Techniques and apparatus for configuring differential channel state information (CSI) reporting for high resolution CSI are provided. One technique includes determining a configuration for a user equipment (UE) to use for reporting differential CSI feedback. The configuration includes at least an indication of when the UE is to report differential CSI feedback, and is signaled to the UE. Once received, the UE reports differential CSI feedback according to the configuration.

28 Claims, 18 Drawing Sheets

(51) Int. Cl.
*H04L 1/00* (2006.01)
*H04W 72/04* (2023.01)

(58) Field of Classification Search
CPC ... H04L 1/1671; H04L 1/0029; H04L 1/0027; H04W 72/04
See application file for complete search history.

(56) References Cited

U.S. PATENT DOCUMENTS

| | | | |
|---|---|---|---|
| 9,603,167 B2 | 3/2017 | Miao et al. | |
| 9,872,242 B2 | 1/2018 | Xiao et al. | |
| 10,015,782 B2 | 7/2018 | Chen et al. | |
| 2010/0099364 A1* | 4/2010 | Yang | H04L 1/003 455/69 |
| 2010/0227561 A1* | 9/2010 | Chakraborty | H04L 5/0085 455/67.11 |
| 2011/0222473 A1* | 9/2011 | Breit | H04L 1/1671 370/328 |
| 2012/0275314 A1* | 11/2012 | Prasad | H04B 7/0417 370/241 |
| 2013/0070723 A1 | 3/2013 | Yie et al. | |
| 2013/0142134 A1 | 6/2013 | Zhu et al. | |
| 2013/0322376 A1* | 12/2013 | Marinier | H04L 1/0027 370/329 |
| 2013/0336214 A1* | 12/2013 | Sayana | H04L 5/0048 370/328 |
| 2014/0079146 A1* | 3/2014 | Kim | H04L 5/0048 375/260 |
| 2014/0086187 A1* | 3/2014 | Kang | H04L 1/0026 370/329 |
| 2015/0003271 A1 | 1/2015 | Park et al. | |
| 2015/0365925 A1* | 12/2015 | Fu | H04W 72/21 370/329 |
| 2017/0201308 A1* | 7/2017 | Park | H04W 16/14 |
| 2017/0366998 A1* | 12/2017 | Lee | H04L 5/00 |
| 2018/0205442 A1* | 7/2018 | Oteri | H04B 7/0632 |
| 2018/0278315 A1* | 9/2018 | Wu | H04B 7/0456 |
| 2019/0044599 A1* | 2/2019 | Kakishima | H04B 7/0632 |

FOREIGN PATENT DOCUMENTS

| | | | |
|---|---|---|---|
| CN | 103580812 A | 2/2014 | |
| CN | 104348592 A | 2/2015 | |
| CN | 105471546 A | 4/2016 | |
| WO | 2011044526 A1 | 4/2011 | |
| WO | WO-2012020862 A1 * | 2/2012 | ........... H04B 7/0632 |
| WO | 2015116619 A1 | 8/2015 | |
| WO | 2017011211 A1 | 1/2017 | |

OTHER PUBLICATIONS

Qualcomm, "Discussion on Hybrid CSI-RS based Operation for eFD-MIMO", May 23, 2016, 3GPP TSG-RAN WG1 #85, R1-164431, pp. 1-5 (Year: 2016).*
International Search Report and Written Opinion—PCT/CN2018/085612—ISA/EPO—Jul. 26, 2018.
International Search Report and Written Opinion—PCT/CN2017/083220—ISA/EPO—Dec. 1, 2017.
Qualcomm Incorporated: "CSI Acquisition for Reciprocity Based Operation", 3GPP TSG RAN WG1 #88bis, R1-1705586, Apr. 7, 2017 (Apr. 7, 2017), pp. 1-4.
Supplementary European Search Report—EP18794200—Search Authority—Munich—Nov. 24, 2020.
Samsung: "System Level Evaluation Results for Beam Management", R1-1705371, 3GPP TSG RAN WG1 Meeting#88 bis, Spokane, USA, Apr. 3-7, 2017 (Apr. 7, 2017), 6 Pages.

* cited by examiner

PROCEDURES FOR DIFFERENTIAL CHANNEL STATE INFORMATION (CSI) REPORTING

CROSS-REFERENCE TO RELATED APPLICATION & PRIORITY CLAIM

This application is a national stage application under 35 U.S.C. 371 of PCT/CN2018/085612, filed May 4, 2018, which claims the benefit of and priority to International Patent Cooperation Treaty Application No. PCT/CN2017/083220, filed May 5, 2017 which are both hereby assigned to the assignee hereof and hereby expressly incorporated by reference herein as if fully set forth below and for all applicable purposes.

TECHNICAL FIELD

Aspects of the present disclosure relate generally to wireless communications systems, and more particularly, to techniques for configuring differential channel state information (CSI) reporting. Embodiments can enable and provide wireless communication features aimed at robust CSI reporting, including, for example, differential CSI, per-stage or multi-stage CSI, and hybrid CSI, capable of yielding high-resolution CSI. Providing dynamic CSI as described can reduce overhead, component complexity, and performance loss.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-recess communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controller (ANCs), etc.), where a set of one or more distributed units, in communication with a central unit, may define an access node (e.g., a new radio base station (NR BS), a new radio node-B (NR NB), a network node. 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly alter reading the section entitled "Detailed Description" one will understand how the features of this disclosure provide advantages that include improved communications between access points and stations in a wireless network.

Certain aspects of the present disclosure generally relate to methods and apparatus for configuring differential channel state information (CSI) reporting.

Certain aspects of the present disclosure provide a method for wireless communication that may be performed, for example, by a user equipment (UE). The method generally includes receiving a configuration for reporting differential channel state information (CSI) feedback. The configuration includes at least an indication of when the UE is to report the differential CSI feedback. The method also includes reporting differential CSI feedback according to the configuration.

Certain aspects of the present disclosure provide a method for wireless communication that may be performed, for example, by a base station (BS). The method generally includes determining a first configuration for a user equipment (UE) to use for reporting differential channel state information (CSI) feedback. The method also includes signaling the first configuration to the UE. The first configuration includes at least an indication of when the UE is to report differential CSI feedback.

Certain aspects of the present disclosure provide an apparatus for wireless communication. The apparatus includes a receiver, a transmitter, at least one processor and a memory coupled to the at least one processor. The receiver is configured to receive a configuration for reporting differential channel state information (CSI) feedback. The configuration includes at least an indication of when the apparatus is to report the differential CSI feedback. The at least one processor is configured to report differential CSI feedback according to the configuration.

Certain aspects of the present disclosure provide an apparatus for wireless communication. The apparatus includes a transmitter, at least one processor and a memory coupled to the at least one processor. The at least one processor is configured to determine a first configuration for a user equipment (UE) to use for reporting differential channel state information (CSI) feedback. The transmitter is configured to signal the first configuration to the UE. The first configuration includes at least an indication of when the UE is to report differential CSI feedback.

Certain aspects of the present disclosure provide an apparatus for wireless communication. The apparatus generally includes means for receiving a configuration for reporting differential channel state information (CSI) feedback. The configuration includes at least an indication of when the apparatus is to report the differential CSI feedback. The apparatus also includes means for reporting the differential CSI feedback according to the configuration.

Certain aspects of the present disclosure provide an apparatus for wireless communication. The apparatus generally includes means for determining a first configuration for a user equipment (UE) to use for reporting differential channel state information (CSI) feedback. The apparatus also includes means for signaling the first configuration to the UE. The first configuration includes at least an indication of when the UE is to report differential CSI feedback.

Certain aspects of the present disclosure provide a computer-readable medium having computer executable code stored thereon for wireless communication by an apparatus. The computer executable code generally includes code for receiving a configuration for reporting differential channel state information (CSI) feedback. The configuration includes at least an indication of when the apparatus is to report the differential CSI feedback. The computer executable code also includes code for reporting the differential CSI feedback according to the configuration.

Certain aspects of the present disclosure provide a computer-readable medium having computer executable code stored thereon for wireless communication by an apparatus. The computer executable code generally includes code for determining a first configuration for a user equipment (UE) to use for reporting differential channel state information (CSI) feedback. The computer executable code also includes code for signaling the first configuration to the UE. The first configuration includes at least an indication of when the UE is to report differential CSI feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
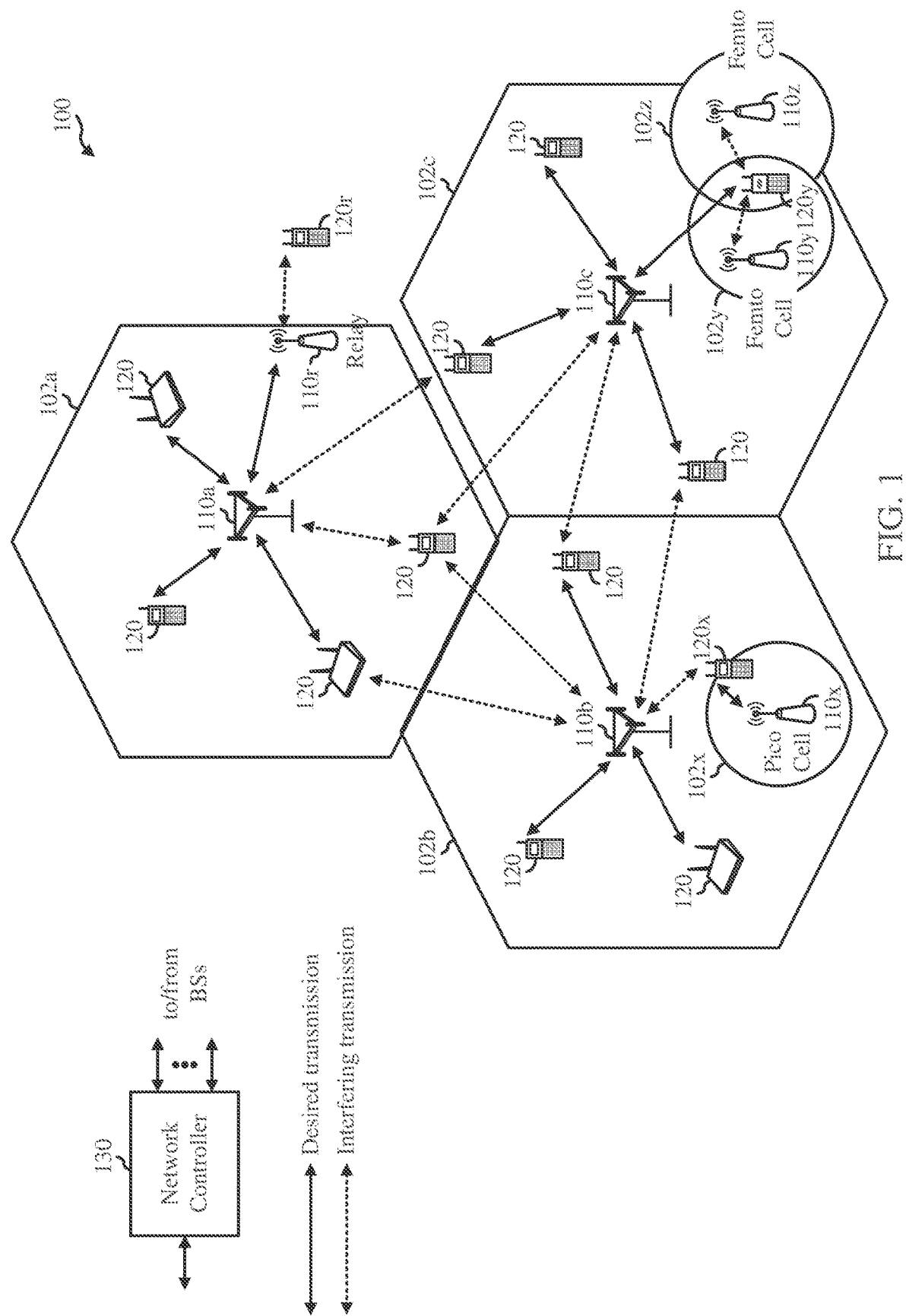
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). Deployments may be realized via 5G communication networks/systems as well as other types of devices, systems, and networks.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist (e.g., in the same subframe).

Some systems (e.g., LTE, NR, etc.) may support advanced CSI reporting in cases where legacy CSI reporting is insufficient to reflect channel information between base stations and UEs. Legacy CSI reporting, for example, generally assumes that the precoding matrix indicator (PMI) is constructed from a single beam, and thus may be insufficient for reflecting the channel information at larger antenna arrays (e.g., for MIMO communications). Advanced CSI reporting can improve CSI accuracy by combining multiple beams, such as discrete Fourier transform (DFT) beams, in the PMI. However, at the same time, advanced CSI reporting may also increase the feedback overhead and the UE processing complexity. Thus, it may be desirable to provide improved techniques for CSI repeating that provide sufficient channel information (e.g., for MIMO communications) while reducing the amount of increased feedback overhead associated with higher resolution CSI.

Differential CSI reporting may enable the UE to provide high resolution CSI while reducing the per feedback overhead associated with advanced CSI reporting. For example, in differential CSI reporting, the UE can report multiple CSI feedback (for a same received CSI-RS) in an incremental way (e.g., over time) over multiple CSI feedback stages. Aspects of the present disclosure provide techniques and apparatus for configuring differential CSI reporting. For example, using the techniques presented herein, a UE can receive a configuration for reporting differential CSI feedback (e.g., reporting multiple CSI feedback in an incremental way over multiple CSI feedback stages). The configuration may include at least an indication of when the UE is to report the differential CSI feedback. The UE may then report differential CSI feedback according to the configuration.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA, cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP), cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Example Wireless Communications System

FIG. 1 illustrates an example wireless network 100 in which aspects of the present disclosure may be performed. For example, the wireless network may be a new radio (NR) or 5G network. UE 120 may receive, from a BS 110, a configuration (e.g., codebook configuration) for reporting differential CSI feedback to the BS 110. The configuration may include at least an indication of when the UE is to report the differential CSI feedback. In one aspect, the configuration may trigger UE 120 to transmit an aperiodic differential CSI feedback report. In one aspect, the configuration may trigger the UE to periodically transmit a differential CSI feedback report (e.g., over one or more time periods). In one aspect, the configuration may trigger UE 120 to periodically transmit non-differential CSI feedback and differential CSI feedback (e.g., over one or more time periods). In one aspect, the configuration may trigger UE 120 to transmit a single differential CSI feedback period. Once the UE 120 receives the configuration, UE 120 may report differential CSI feedback to the BS 110 according to the configuration.

For example, UE 120 may receive a CSI reference signal (CSI-RS) from the BS 110. UE 120, in turn, may report CSI feedback in a differential manner. That is, when reporting CSI feedback based on a received CSI-RS, UE 120 may report multiple CSI feedback in an incremental way over multiple CSI feedback stages (or instances). In one example, UE 120 may determine, for a first CSI feedback stage, one or more first feedback components associated with first CSI feedback based on the CSI-RS, and report the first feedback components to the BS 110. The UE 120 may determine, for at least one second CSI feedback stage, one or more second feedback components associated with at least one second CSI feedback based in part on the first feedback components, and report the second feedback components to the BS.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. MTC devices and/or eMTC devices, as well as other types of devices, may include Internet of Everything (IoE) or Internet of Things (IoT) devices, such as NB-IoT devices, and techniques disclosed herein may be applied to MTC devices, eMTC devices, NB-IoT devices, as well as other devices. A wireless node may provide, for example, connectivity for or to a network (e.g., a wide area network such as Internet or a cellular network) via a wired or wireless communication link.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz. (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR (in one reference example) are described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interlace, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
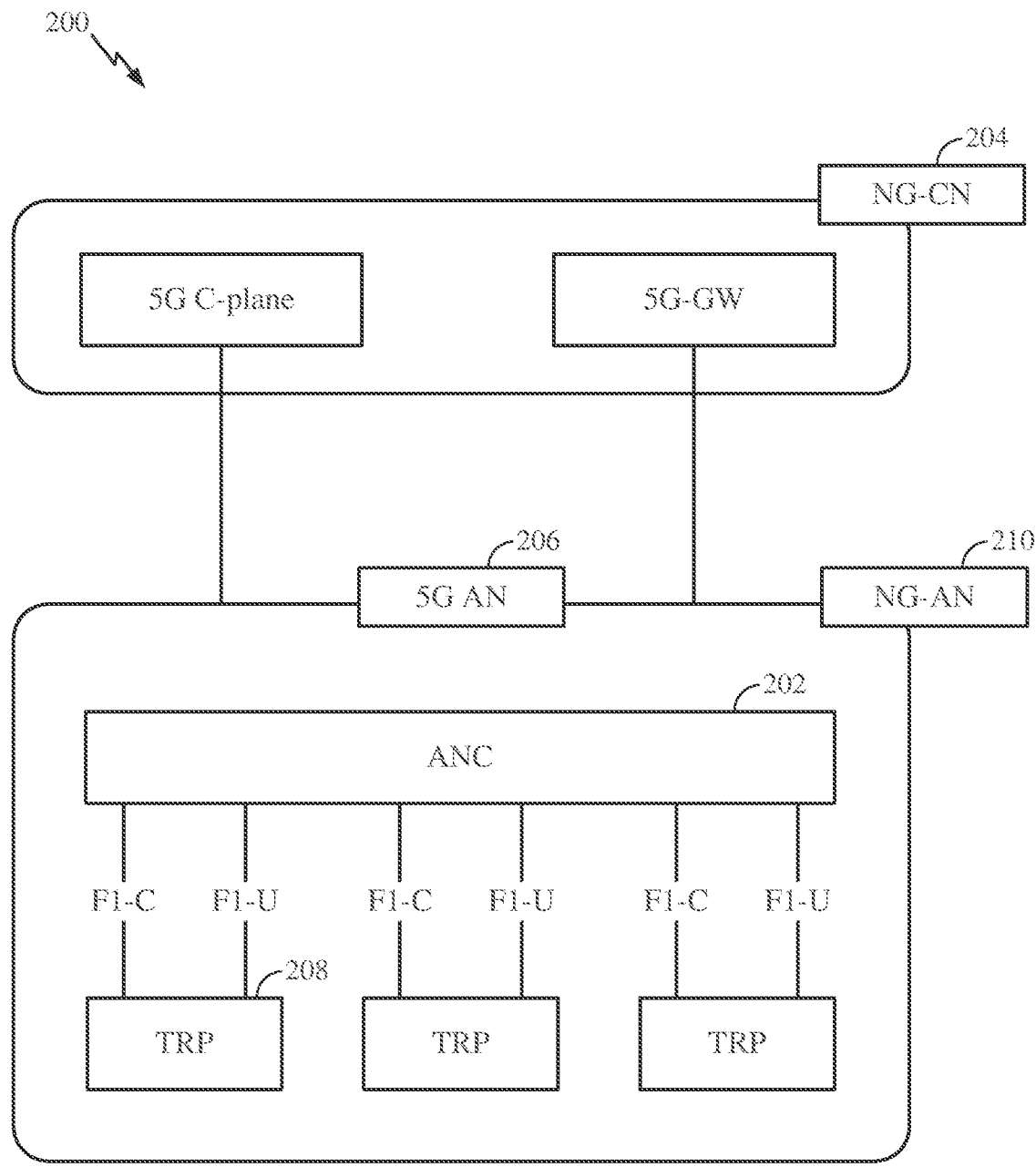
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interlace to neighboring next generation access nodes (NG-ANs) may terminate at the ANC. The ANC may include one or more TRPs 208 (which may also be referred to as BSs, NR BSs, Node Bs. 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer. Packet Data Convergence Protocol (PDCP) layer, Radio Link Control (RLC) layer, Medium Access Control (MAC) layer, and a Physical (PHY) layers may be adapt ably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
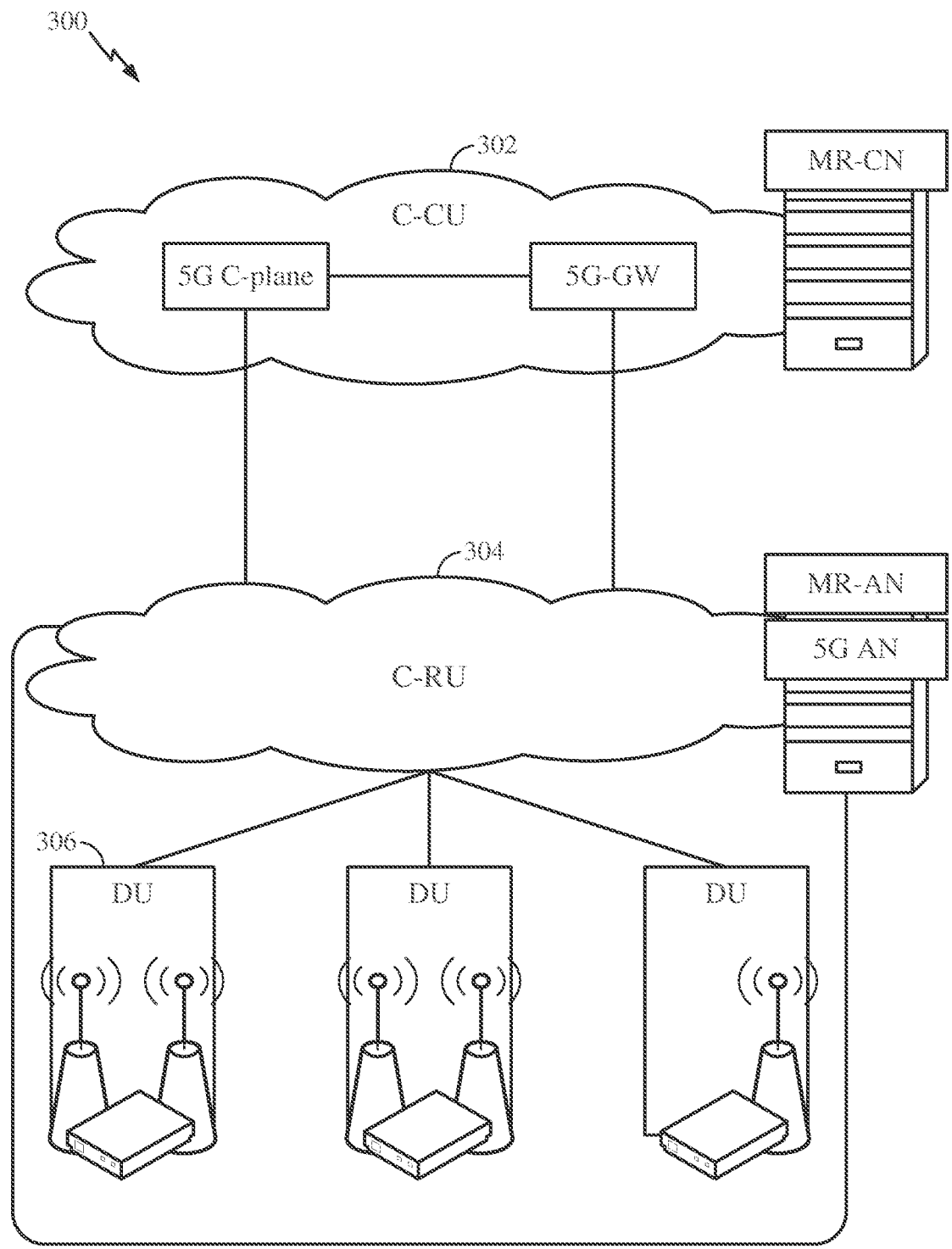
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
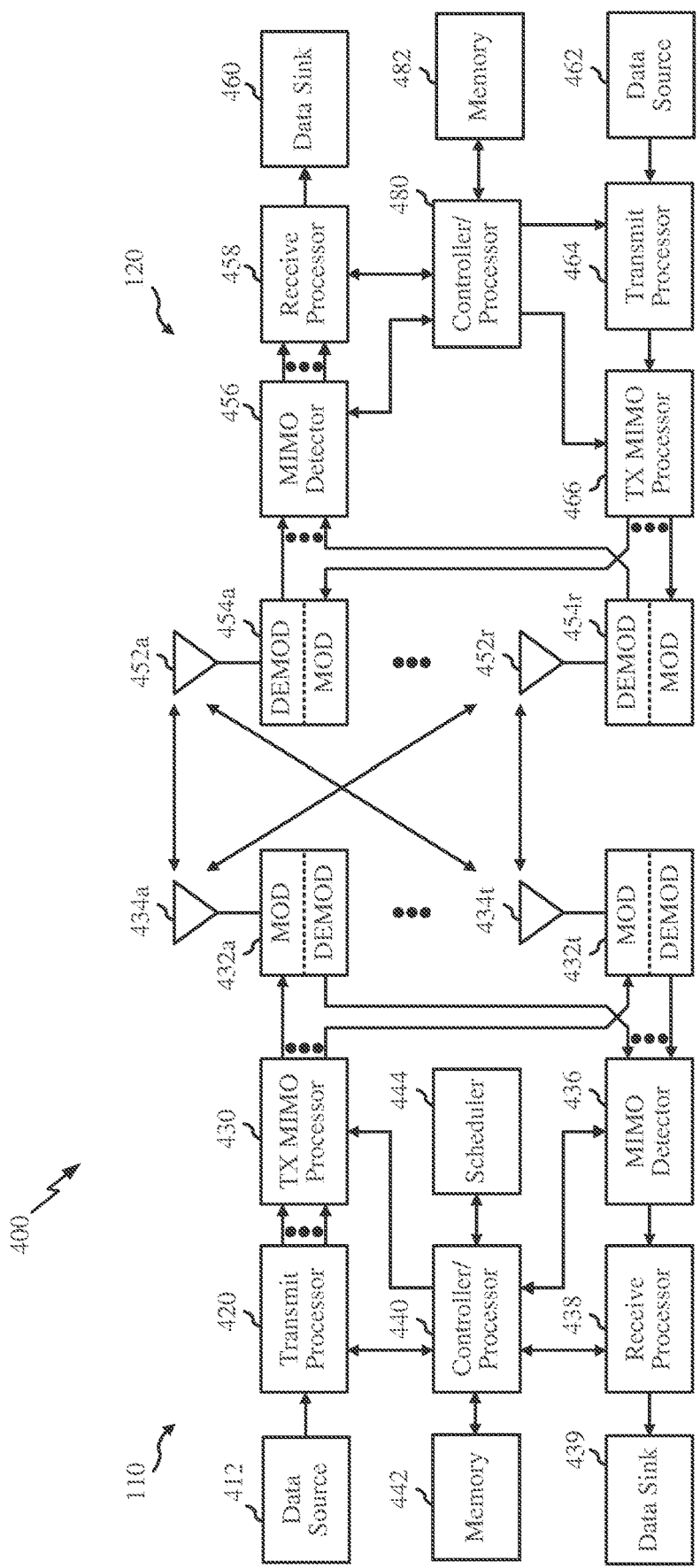
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-18.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., preceding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The controller/processor 480 and/or other processors and modules at the UE 120 may also perform or direct, e.g., the execution of the functional blocks illustrated in FIG. 9, operations associated with the UE illustrated in FIGS. 8 and 11-19, and/or other processes for the techniques described herein. By enabling controller/processor 480 and/or other modules 31 the UE 120 to perform operations in FIGS. 8-9 and 11-19, the controller/processor 480 and/or other modules at the UE 120 can provide the BS with a full channel information (that includes accurate channel fading behavior) during differential CSI feedback reporting, while avoiding the increased per feedback typically associated with providing high resolution CSI.

Figure 10:
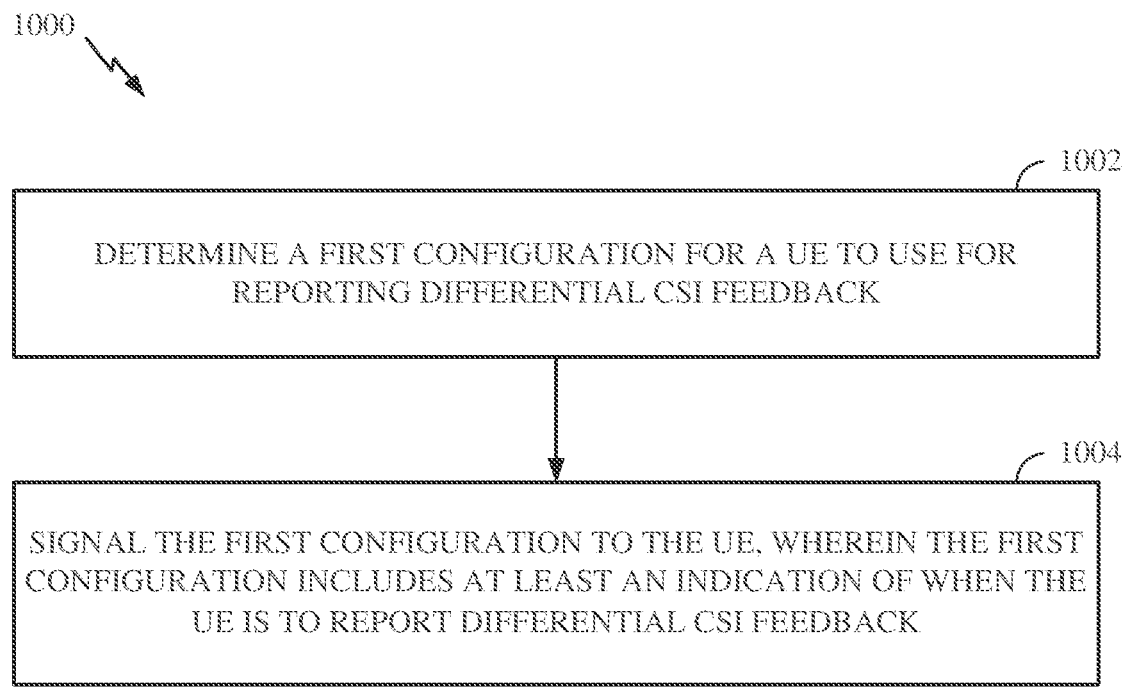
FIG. 10 is a flow diagram illustrating example operations that may be performed by a BS, for configuring differential channel state information (CSI) feedback reporting, in accordance with certain aspects of the present disclosure.

The controller/processor 440 and/or other processors and modules at the BS 110 may also perform or direct, e.g., the execution of the functional blocks illustrated in FIG. 10, operations associated with the BS illustrated in FIGS. 8 and 11-19, and/or other processes for the techniques described herein. By enabling controller/processor 440 and/or other modules at the BS 110 to perform operations in FIGS. 8 and 10-19, the controller/processor 440 and/or other modules at the BS 110 can enable the BS to more efficiently acquire full channel information (e.g., including accurate channel fading behavior) during differential CSI feedback reporting. The memories 442 and 482 may store data and program codes for the BS 110 and the UE 120, respectively. A scheduler 444 may schedule UEs for data transmission on the downlink and/or uplink.

Figure 5:
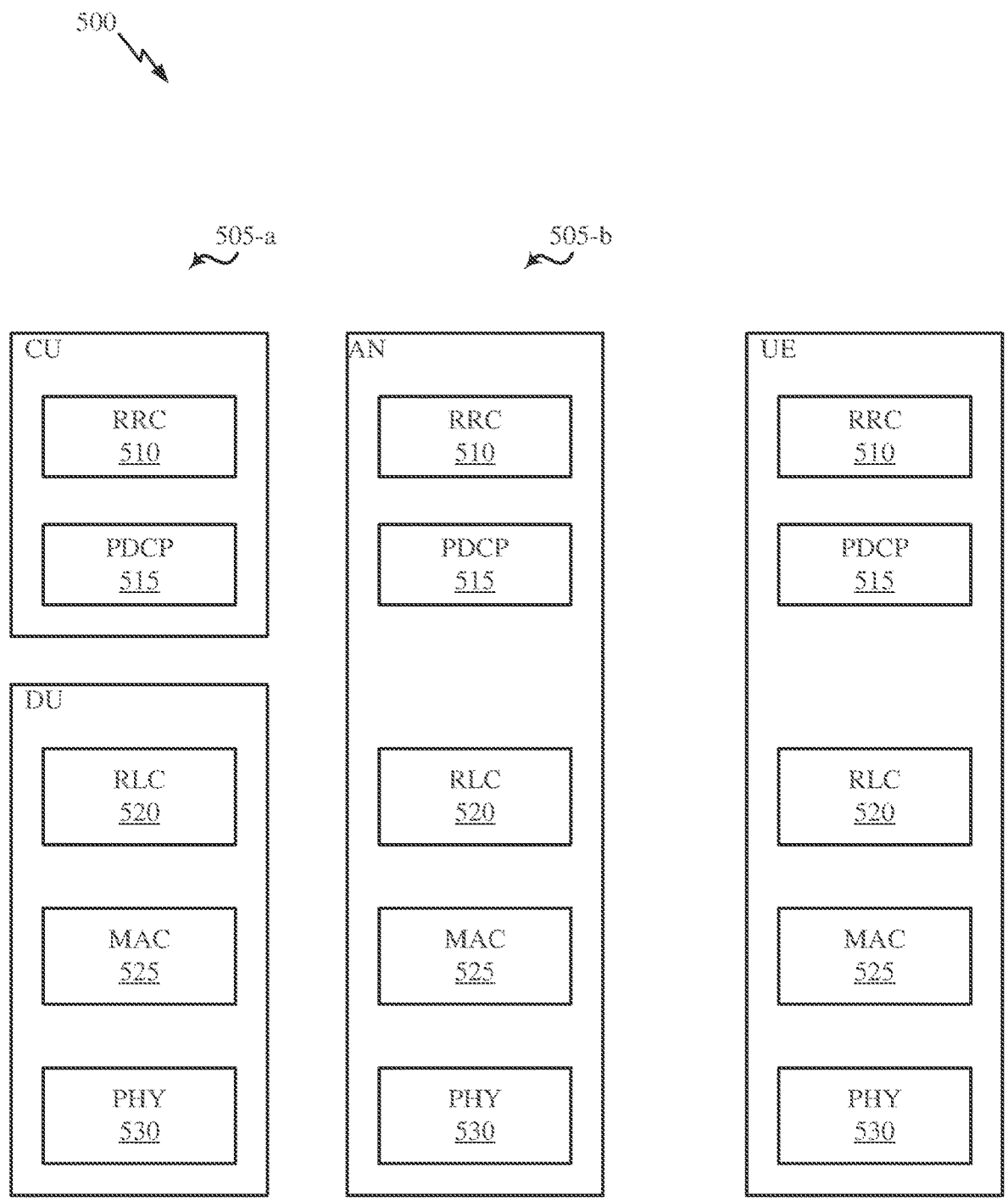
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
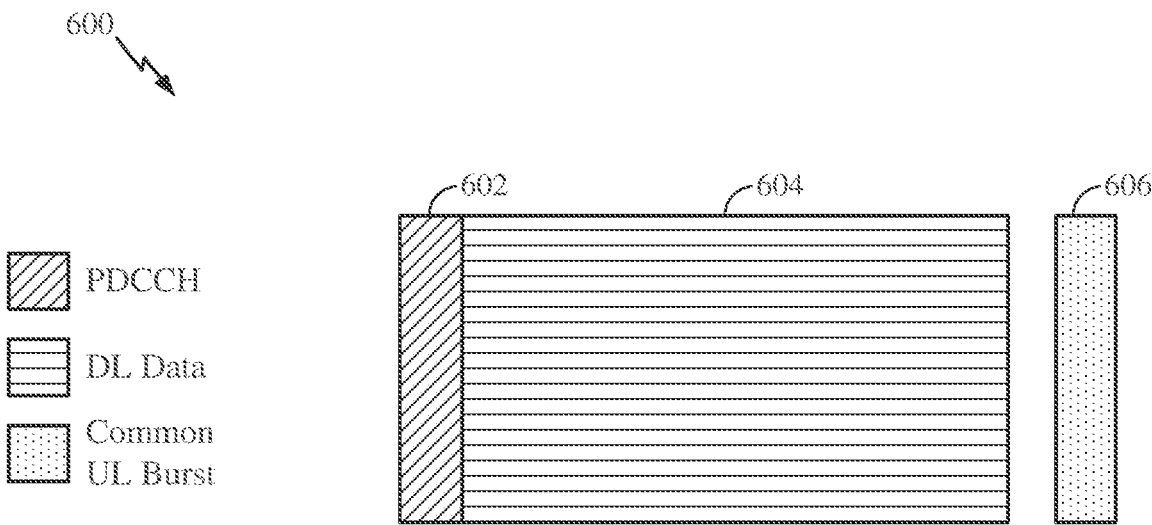
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
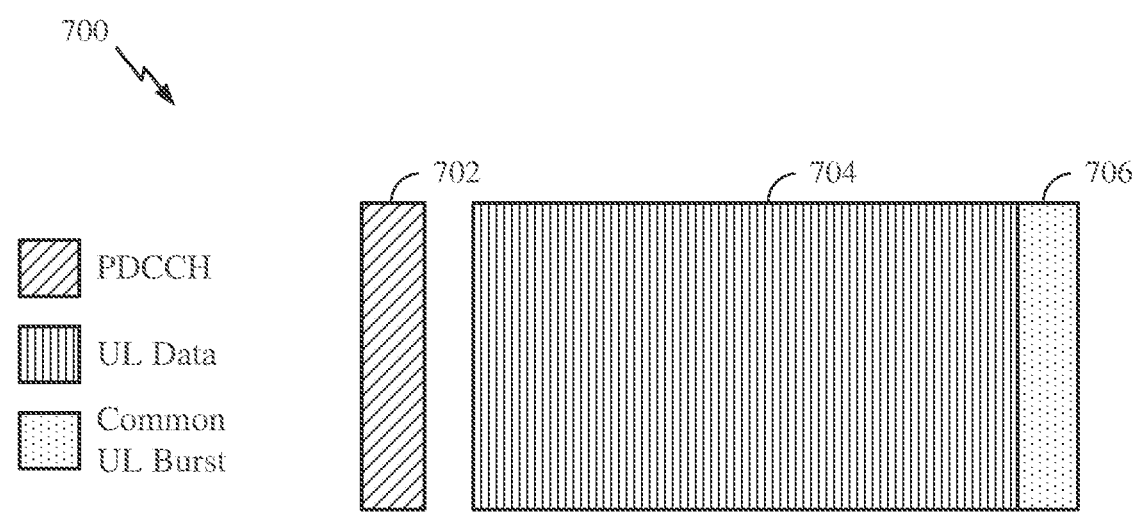
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, it there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services. UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In wireless communications, CSI may refer to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

In certain systems (e.g., Release 13 long term evolution (LTE)). CSI feedback is generally based on a pre-defined codebook. This may be referred to as implicit CSI feedback. Precoding may be used for beamforming in multi-antenna systems. Codebook based precoding uses a common codebook at the transmitter and receiver. The codebook includes a set of vectors and matrices. The UE calculates a precoder targeting maximum single-user (SU) multiple input multiple output (MIMO) spectrum efficiency. The implicit CSI feedback can include a rank indicator (RI), a PMI, and associated channel quality indicator (CQI) based on the PMI. The PMI includes a $W_1$ precoding matrix and a $W_2$ preceding matrix.

In 3GPP Release 13 Full-Dimension MIMO (FD-MIMO), an official name for the MIMO enhancement in 3GPP, class A and class B type CSI feedback assumes PMI is constructed from a single DFT beam or single beam selection. Thus, an issue with the legacy CSI reporting is that the legacy CSI reporting (which typically has a low CSI resolution) may be insufficient to reflect (e.g., full) channel information, which in turn can degrade SU/MU-MIMO performance, especially at larger antenna arrays.

Advanced CSI (Adv-CSI) reporting is thus proposed in Release 14 to improve CSI accuracy by combining multiple beams (e.g. DPT beams) based on power and/or phasing based codebook. Adv-CSI generally has a dual codebook structure $W=W_1W_2$. $W_1$ may be reported on the wideband, and $W_2$ may be reported on the subband. $W_1$ may include a set of L orthogonal beams, e.g., 2D-DFT beams. The set of L beams may be selected from a set of oversampled 2D-DFT beams. $W_1$ may be constructed based on the L orthogonal beams and their power weights.

For example $$W_1 = \begin{bmatrix} B & 0 \\ 0 & B \end{bmatrix},$$

where $B=[p_0 b_{k_1^{(0)} k_2^{(0)}}, \ldots, p_{L-1} b_{k_1^{(L-1)} k_2^{(L-1)}}]$, L is the number of beams, $b_{k_1^{(i)} k_2^{(i)}}$ is a 2D-DFT beam (e.g., from an oversampled 2D-DFT grid), $k_1=0, 1, \ldots, N_1 O_1 -1$, $k_2=0, 1, \ldots, N_2 O_2 -1$, and $p_i$ (where $0 \leq p_i \leq 1$) is the beam power scaling factor (e.g., power weight) for beam i. $N_1$ is a size in a $1^{st}$ dimension (e.g., horizontal direction) and $N_2$ is a size in a $2^{nd}$ dimension (e.g., vertical direction). $O_1$ and $O_2$ are the oversampling factors in the $1^{st}$ and $2^{nd}$ dimensions, respectively. $W_2$ is the phase weight after $W_1$ and may include the phase quantization of beam combining coefficients $$\text{For rank 1, } W = \begin{bmatrix} \tilde{w}_{0,0} \\ \tilde{w}_{1,1} \end{bmatrix} = W_1 W_2 \text{ and } W_2 = \begin{bmatrix} c_{0,0} \\ c_{1,0} \end{bmatrix}.$$

$$\text{For rank 2, } W = \begin{bmatrix} \tilde{w}_{0,0} & \tilde{w}_{0,1} \\ \tilde{w}_{1,0} & \tilde{w}_{1,1} \end{bmatrix} = W_1 W_2 \text{ and } W_2 = \begin{bmatrix} c_{0,0} & c_{0,1} \\ c_{1,0} & c_{1,1} \end{bmatrix}.$$

$$c_{r,l} = [c_{r,i,0}, \ldots, c_{r,l,L-1}]^T,$$

where $c_{r,l,l}$ is the beam combining coefficient for beam i on polarization r and layer l, r=0, 1, and l=0,1. $\tilde{w}_{r,l} = \sum_{i=0}^{L-1} b_{k_1^{(i)} k_2^{(i)}} \cdot p_i \cdot c_{r,l,i}$, where r=0, 1 and l=0, 1.

Assuming $W_1$ is constructed based on 2 orthogonal beams and their power weight, $W_1$ can be represented as $W_1 = I_2 \otimes (B \times P)$, where $B=[b_0 b_1]$, $b_0$ and $b_1$ are orthogonal 2D-DFT beams, $P=[p_0 p_1]$, and $p_0$, $p_1$ are the power weight on the $1^{st}/2^{nd}$ beam, respectively. Note $I_2 \otimes$ represents the same weight on the cross polarization (X-Pol). The selection of $b_0$ ($1^{st}$ beam) may be from the oversampled 2D-DFT beam grids. For example, for the $1^{st}$ leading (stronger) beam index, $k_1^{(0)}=0, 1, \ldots, N_1 O_1 -1$ and $k_2^{(0)}=0, 1, \ldots, N_2 O_2 -1$. The selection of $b_1$ ($2^{nd}$ beam) may be dependent on the $1^{st}$ beam, with a maximum of 3 bits to indicate the relationship with the $1^{st}$ beam. For example, for the $2^{st}$ (weaker) beam index, $k_1^{(1)}=k_1^{(0)}+O_1 d_1$ and $k_2^{(1)}=k_2^{(0)}+O_2 d_2$, where $d_1 \in \{0, \ldots, \min(N_1 L_1 -1)\}$, $d_2 \in \{0, \ldots, \min(N_2 L_2 -1)\}$ and $(d_1, d_2) \neq (0,0)$. If $N_1 \geq N_2$ and $N_2 \neq 1$, then $L_1 = 4$ and $L_2 = 2$. If $N_1 < N_2$ and $N_1 \neq 1$, then $L_1 = 2$ and $L_2 = 4$. If $N_2 = 1$, and $N_2 \neq 1$, then $L_1 = 4$ and $L_2 = 2$. In some cases, $O_1 = O_2 = 4$. In some cases, if $N_2 = 1$, $O_2 = 1$. In some cases, $2N_1 N_2 \in \{4, 8, 12, 16, 20, 24, 28, 32\}$.

For $W_1$, $P$ generally represents a 2 bit quantization of the power weight. In some cases, $p_0 = 1$ and $p_1 \in \{1, \sqrt{0.5}, \sqrt{0.25}, 1\}$. For $W_2$, $c_{0,0,0} = c_{0,1,0} = 1$, where $c_{r,l,i} \in \{1, j, -1, -j\}$ $\forall$ i, r, l. QPSK quantization may be used for each phase except $c_{0,0,0} = c_{0,1,0} = 1$. For $W_1$, the codebook payload may include 13 bits for rank 1 and 13 bits for rank 2. For $W_2$, the code book payload may include 6 bits for rank 1 and 12 bits for rank 2.

Generally, Type I feedback (e.g., implicit CSI feedback) includes normal codebook-based PMI feedback with normal (low) spatial resolution, whereas Type II feedback includes enhanced "explicit" feedback and/or codebook-based feedback with higher spatial resolution. In NR, CSI feedback may support advanced CSI feedback at least in Type II feedback. The "resolution" of CSI feedback (e.g., codebook) may refer to the amount of information in the channel feedback and/or quality of the channel feedback. For example, lower resolution feedback, such as Type I feedback, may have a lower spatial resolution (reflecting a smaller number of the propagation paths of the channel between the transmitter and the receiver) compared to higher resolution feedback, such as Type II feedback, which may have a higher spatial resolution (reflecting a larger number of the propagation paths of the channel between the transmitter and the receiver). With lower resolution feedback, the BS may obtain a coarse approximation of the channel. However, such a coarse approximation may not be able to obtain sufficient performance for MIMO communications. Higher resolution feedback may enable the BS to obtain a more accurate approximation of the channel, which can boost the efficiency of MIMO communications.

There may be some drawbacks associated with advanced CSI reporting including, e.g., increases in feedback overhead, increased UE processing complexity and/or possible performance losses compared to legacy CSI reporting. In one reference example, the $W_1$ overhead for $N_1 = N_2 = 4$ (in Adv-CSI) may include a total of 13 bits, where 8 bits (e.g., $[\log 2(N_1 N_2 O_1 O_2)] = [\log 2(16 N_1 N_2)] = 8$) are used to indicate, the leading $1^{st}$ beam, 3 bits are used to indicate the $2^{nd}$ beam, and 2 bits are used to indicate the relative power of the $2^{nd}$ beam. In some cases, advanced CSI reporting may achieve performance gain at the cost of an increased codebook size, which generally means that the total feedback overhead is increased. In such cases, the increased payload size associated with the feedback may exceed a limit (e.g., the limited payload size associated with periodic reporting on PUCCH). Additionally, in some cases, advanced CSI reporting may achieve performance gain at the cost of increased UE processing complexity. Further, in some cases, if the quantization for advanced CSI reporting is not properly configured (e.g., high resolution CSI is generally associated with high quantization levels), legacy CSI reporting may outperform advanced CSI reporting.

Differential CSI reporting can achieve high resolution CSI while reducing the per feedback overhead associated with advanced CSI reporting. As used herein, differential CSI reporting may refer to reporting multiple CSI feedback reports in an incremental way over time via multiple CSI feedback stages. That is, each CSI feedback reported by the UE in a given CSI feedback stage may depend in part on a previous CSI feedback reported by the UE in a previous CSI feedback stage. Each CSI feedback stage may occur at a different point in time. Using the differential CSI reporting scheme described herein (as opposed to a CSI reporting scheme in which each CSI feedback is independent) enables the BS to more efficiently acquire full channel information (e.g., the combined PMI as well as the CQI) that the BS can use for subsequent MIMO communications. That is, the BS may not have to perform additional calculations to obtain the channel information.

Differential CSI reporting may be enabled by changing the structure of the codebook design of LTE Adv-CSI. Consider, for example, the following codebook design (1) of LTE Adv-CSI, in which the codebook W is constructed with 2 beams combination and rank 1:

$$W = W_1 W_2 = \begin{bmatrix} p_0 b_{k_1^0, k_2^0}, p_1 b_{k_1^1, k_2^1} & 0 \\ 0 & p_0 b_{k_1^0, k_2^0}, p_1 b_{k_1^1, k_2^1} \end{bmatrix} \begin{bmatrix} c_{0,0} \\ c_{1,0} \end{bmatrix} \quad (1)$$

where $c_{r,\lambda,0}, c_{r,\lambda,1}]^T$, $b_{k[k]}$ is the DPT beam vector for the $l^{th}$ beam, $p_l$ is the power weighting for the $l^{th}$ beam, and $c_{r,\lambda,0}$ is is the cophasing for polarization r, rank $\lambda$, beam l, $c_{0,\lambda,0}=1$. In some cases, a fixed beam power may be used for the first beam (i.e., $p_0 = 1$ for l=0).

In some aspects, the codebook design in (1) may be changed to the following codebook design in (2) in order to enable differential CSI reporting:

$$W = W_1^0 W_2^0 + W_1^1 W_2^1 = \begin{bmatrix} p_0 b_{k_1^0, k_2^0} & 0 \\ 0 & p_0 b_{k_1^0, k_2^0} \end{bmatrix} \begin{bmatrix} c_{0,0,0} \\ c_{1,0,0} \end{bmatrix} + \begin{bmatrix} p_1 b_{k_1^1, k_2^1} & 0 \\ 0 & p_1 b_{k_1^1, k_2^1} \end{bmatrix} \begin{bmatrix} c_{0,0,1} \\ c_{1,0,1} \end{bmatrix}. \quad (2)$$

$W_1^0 W_2^0$ may represent the normal or lower resolution part of the codebook (e.g., $1^{st}$ CSI feedback). For example, the "lower resolution" may include a small amount of information representing a coarse approximation of the channel (e.g., $W_1^0 W_2^0$ includes the power weighting and cophasing for a single (first) beam). $W_1^0 W_2^0$ may represent the higher resolution part of the codebook (e.g., $2^{nd}$ CSI feedback). With each additional CSI feedback stage, the CSI feedback may include additional information representing a more detailed approximation of the channel (e.g., $W_1^1 W_2^1$ includes an additional second beam's coefficients). Additionally, the higher resolution part of the codebook may further include additional stages of CSI feedback (e.g., $3^{rd}$ CSI feedback, $4^{th}$ CSI feedback, $5^{th}$ CSI feedback, and so on).

The differential CSI feedback described herein may include multiple CSI feedback reports, where each CSI feedback report depends in part on a previous CSI feedback. By using a differential CSI feedback scheme, in which each CSI feedback report depends in part on a previous CSI feedback, the BS can more efficiently acquire full channel information (e.g., the combined PMI as well as the CQI) for an accurate approximation of the channel, without performing additional calculations typically associated with CSI feedback schemes in which each CSI feedback report is independent. The 1$^{st}$ CSI feedback may be based on the feedback of "lower resolution" CSI. Examples of such "lower resolution" CSI may include class A type CSI (e.g., for LTE), Type I CSI (e.g., for NR-MIMO), advanced (e.g., Type II) CSI configured with 2 beams, etc. Note, however, that the techniques presented herein can be applied to situations in which more than two beams are used (e.g., three beams, four beams, etc.). The 1$^{st}$ CSI feedback may include a complete CSI report with PMI, CQI and RI included. The 2$^{nd}$ to m$^{th}$ CSI feedback may include the additional beams' coefficients for combination. For example, each CSI$_x$ may include PMI$_x$/CQI$_x$/RI$_x$ for the x$^{th}$ reporting instance, where $2 \leq x \leq m$.

Figure 8:
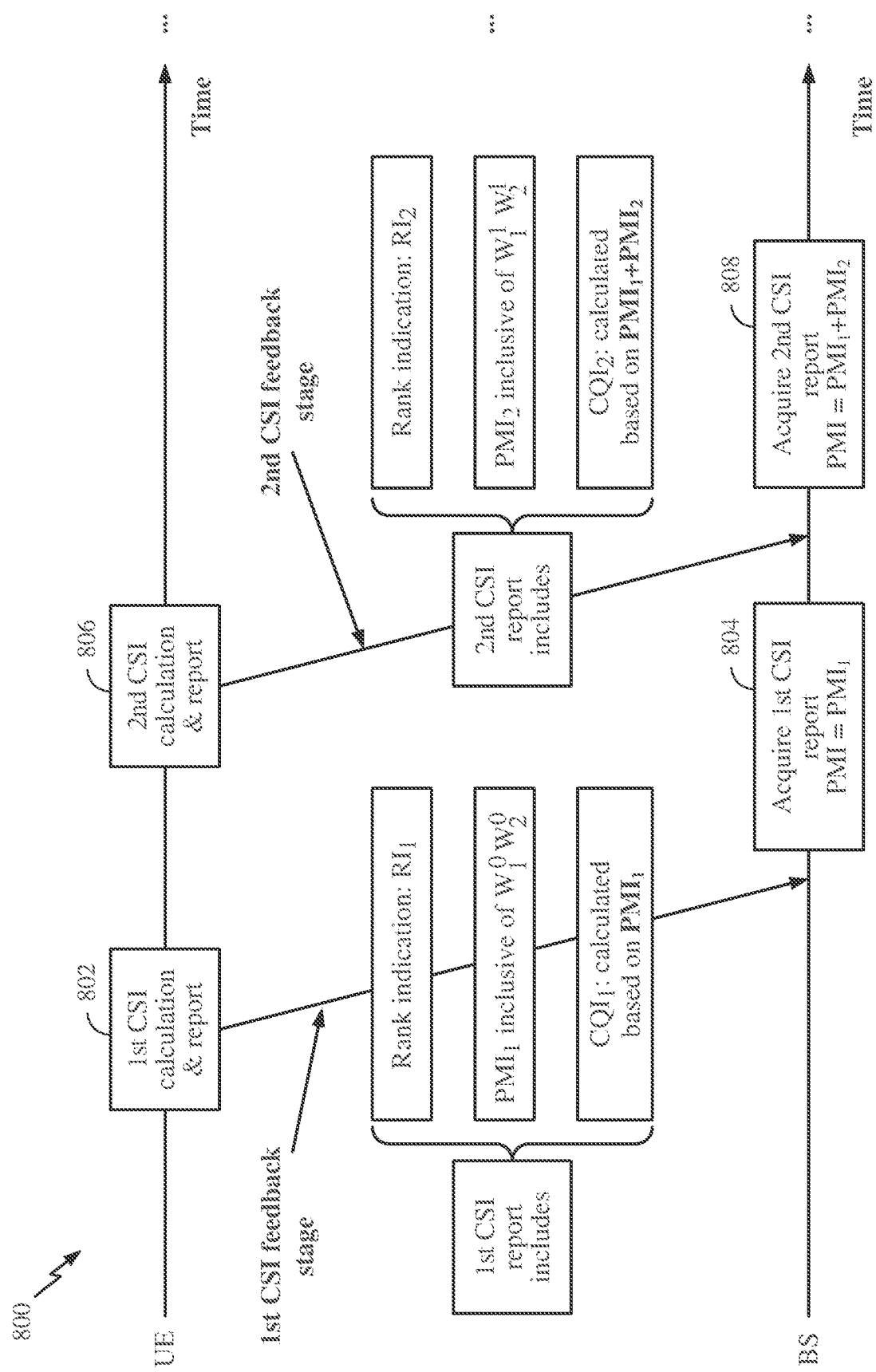
FIG. 8 is a call flow diagram illustrating example signaling and differential CSI feedback reporting, in accordance with certain aspects of the present disclosure.

FIG. 8 is a call flow diagram 800 illustrating example signaling and differential CSI feedback reporting over multiple CSI feedback stages (e.g., at least two CSI feedback stages), in accordance with certain aspects of the present disclosure. Each CSI feedback stage (or instance) may refer to a different instance in time in which the UE reports CSI feedback. The CSI feedback reported in a given CSI feedback stage may be based in part on CSI feedback reported in a previous CSI feedback stage and/or a received CSI-RS (e.g., in the case of the first CSI feedback stage). Note that while the differential CSI feedback reporting in FIG. 10 uses advanced CSI in Type II CSI feedback as a reference example of a CSI feedback scheme used by the UE, those of ordinary skill in the art will recognize that the differential CSI feedback reporting techniques described herein can be used for other types of CSI feedback schemes.

At 802, for the first CSI feedback stage, the UE performs a 1$^{st}$ CSI calculation (e.g., based on a received CSI-RS, not shown) and reports the 1$^{st}$ CSI feedback to the BS. The 1$^{st}$ CSI report includes RI$_1$, PMI$_1$ and CQI$_1$ (which is calculated based on PMI$_1$). PMI$_1$ includes feedback components $W_1^0 W_2^0$. At 804, the BS acquires the 1$^{st}$ CSI report and sets PMI=PMI$_1$. At 806, for the second CSI feedback stage, the UE subsequently performs a second CSI calculation and reports the 2$^{nd}$ CSI feedback to the BS. The 2$^{nd}$ CSI report includes RI$_2$, PMI$_2$ and CQI$_2$ (which is calculated based on PMI$_1$+PMI$_2$). PMI$_2$ includes feedback components $W_1^1 W_2^1$. At 808, the BS acquires the 2$^{nd}$ CSI report and sets PMI=PMI$_1$+PMI$_2$. Although not shown, the UE may continue to perform CSI calculations and send CSI reports (e.g., 3$^{rd}$ CSI report, 4$^{th}$ CSI report, and so on) in additional CSI feedback stages (e.g., 3$^{rd}$ CSI feedback stage, 4$^{th}$ feedback stage, and so on). Similarly, although not shown, the BS may receive the CSI reports in the additional CSI feedback stages and determine PMI based on the CSI report received in the current CSI feedback stage and the CSI report(s) received in the previous CSI feedback stage(s).

As noted, the differential CSI feedback reporting techniques described herein can be used for other CSI feedback schemes (e.g., in addition to the advanced CSI Type II CSI feedback). For example, in some aspects, the differential CSI feedback reporting techniques may be used for Type II single-panel (SP) codebook (e.g., for NR MIMO).

For Type II SP codebook, NR may support Type II Category I CSI for rank 1 and rank 2. The PMI may be used for spatial channel information feedback. For rank 1, the PMI codebook may have the following precoder structure in (3), and for rank 2, the PMI codebook may have the following precoder structure in (4):

$$W = \begin{bmatrix} \tilde{w}_{0,0} \\ \tilde{w}_{1,0} \end{bmatrix} = W_1 W_2 \quad (3)$$

$$W = \begin{bmatrix} \tilde{w}_{0,0} & \tilde{w}_{0,1} \\ \tilde{w}_{1,0} & \tilde{w}_{1,1} \end{bmatrix} = W_1 W_2, \quad (4)$$

where W is normalized to 1 in (3), columns of W are normalized to $$\frac{1}{\sqrt{2}}$$

in (4) and $\tilde{w}_{r,l}$ is defined in (5).

The PMI codebook may include a weighted combination of L beams. For example, as shown in (5):

$$\tilde{w}_{r,l} = \Sigma_{i=0}^{L-1} b_{k_1^{(i)}, k_2^{(i)}} \cdot p_{r,l,i}^{(WB)} \cdot p_{r,l,i}^{(SB)} \cdot c_{r,l,i}, \quad (5)$$

where the value of L is configurable (e.g., $L \in \{2, 3, 4\}$), $b_{k_1^{(i)}, k_2^{(i)}}$ is an oversampled 2D-DFT beam, r=0, 1 (polarization), l=0, (layer), $p_{r,l,i}^{(WB)}$ is the wideband (WB) beam amplitude scaling factor for beam i on polarization r and layer l, $p_{r,l,i}^{(SB)}$ is the subband (SB) beam amplitude scaling factor for beam i on polarization r and layer l, and $c_{r,l,i}$ is the beam combining coefficient (phase) for beam i on polarization r and layer l, $c_{r,l,i}$ may be configurable between QPSK (2 bits) and 8PSK (3 bits). Type II SP may support a configurable amplitude scaling mode between WB+SB (with unequal bit allocation) and WB only.

In some cases, the beam selection may be wideband only. For example, there may be an unconstrained beam selection from an orthogonal basis, where $k_1^{(i)} = O_1 \cdot n_1^{(i)} + q_1$, $k_2^{(i)} = O_2 \cdot n_2^{(i)} = q_2$, $q_1$ and $q_2$ are rotation factors, $n_1^{(i)}$ and $n_2^{(i)}$ are orthogonal beam indices, and i=0, . . . , L-1, $q_1$=0, . . . , $O_1$-1, $q_2$=0, . . . , $O_2$-1, $n_1^{(i)}$=0, . . . , $N_1$-1, and $n_2^{(i)}$=0, . . . , $N_2$-1. Table 1 shows the values of ($N_1$,$N_2$) and ($O_1$, $O_2$) that may be supported for beam selection in Type II SP codebook. Note that in some cases, beam selection may not be used in cases where there are 4 CSI-RS ports and L=2 and in cases where there are 8 CSI-RS ports and L=4.

TABLE I

Beam Selection for Type II SP Codebook

| Number of CSI-RS ports | ($N_1$, $N_2$) | ($O_1$, $O_2$) |
|---|---|---|
| 4 | (2, 1) | (4, —) |
| 8 | (2, 2) | (4, 4) |
|   | (4, 1) | (4, —) |
| 12 | (3, 2) | (4, 4) |
|   | (6, 1) | (4, —) |
| 16 | (4, 2) | (4, 4) |
|   | (8, 1) | (4, —) |
| 24 | (6, 2), (4, 3) | (4, 4) |
|   | (12, 1) | (4, —) |
| 32 | (8, 2), (4, 4) | (4, 4) |
|   | (16, 1) | (4, —) |

The amplitude scaling factors $p_{r,i,l}^{(WB)}$ and $p_{r,i,l}^{(SB)}$ may be independently selected for each beam, polarization, and layer. The UE may be configured to report $p_{r,i,l}^{(WB)}$ with or without $p_{r,i,l}^{(SB)}$. For example, when reporting wideband $p_{r,i,l}^{(WB)}$ and subband $p_{r,i,l}^{(WB)}$, both ($p_{0,0,i}^{(WB)} \neq p_{0,1,i}^{(WB)} \neq p_{1,0,i}^{(WB)} \neq p_{1,1,i}^{(WB)}$) and ($p_{0,0,i}^{(SB)} \neq p_{0,1,i}^{(SB)} \neq p_{1,0,i}^{(SB)} \neq p_{1,1,i}^{(SB)}$) are possible. When reporting wideband $p_{r,i,l}^{a(WB)}$ only, ($p_{0,0,1}^{(WB)} \neq p_{0,1,i}^{(WB)} \neq p_{0,1,i}^{(WB)} \neq p_{1,0,i}^{(WB)} \neq p_{1,1,i}^{(WB)}$) is possible. In some cases, three bits may be used to indicate the wideband amplitude value from the set $\{1, \sqrt{0.5}, \sqrt{0.25}, \sqrt{0.125}, \sqrt{0.0625}, \sqrt{0.0313}, \sqrt{0.0156}, 0\}$. The PMI payload can vary depending on whether an amplitude is zero or not.

The beam combining coefficients (e.g., phase) may be independently selected for each beam, polarization, and layer, and may be reported on the subband. The phase value set can be $$\{e^{j\frac{\pi n}{2}}, n = 0, 1, 2, 3\}$$

(e.g., using 2 bits) or $$\{e^{j\frac{\pi n}{4}}, n = 0, 1, \ldots, 7\}$$

(e.g., using 3 bits).

For Type II SP codebook, the WB amplitude, SB amplitude, and SB phase may be quantized and reported in (X, Y, Z) bits. For each layer, for the leading (strongest) coefficient out of 2L coefficients, (X, Y, Z)=(0, 0, 0). The leading (strongest) coefficient=1.

For WB+SB amplitude, (X, Y)=(3, 1) and Z ∈ {2, 3} for the first (K−1) leading (strongest) coefficients out of (2L−1) coefficients, and (X, Y, Z)=(3, 0, 2) for the remaining (2L−K) coefficients. For L=2, 3, and 4, the corresponding value of K is 4 (=2L), 4, and 6, respectively. The index of strongest coefficient out of 2L coefficients (per layer) may be reported in a WB manner. The (K−1) leading coefficients may be determined implicitly from reported (2L−1) WB amplitude coefficients per layer without additional signaling.

For WB-only amplitude (i.e., Y=0), (X, Y)=(3, 0) and Z ∈ (2, 3). The index of the strongest coefficient out of 2L coefficients may be reported per layer in a WB manner.

Example Procedures for Configuring Differential CSI Reporting

As noted, the Type II CSI reporting design in NR-MIMO (e.g., Release 15) may incur significant feedback overhead. Thus, it may be difficult to report Type II CSI feedback on channels, such as PUCCH which generally support limited payload sizes. In addition, the Type-II CSI reporting design in NR-MIMO may support aperiodic CSI feedback and not support periodic CSI feedback. However, with aperiodic CSI feedback, it may be difficult to accurately trace/capture the channel fading behavior.

Differential CSI reporting, which supports Type-II CSI feedback, can be used to provide high resolution CSI while reducing the per-feedback overhead associated with Type-II CSI reporting. However, current differential CSI reporting techniques may not accurately capture channel fading during the multiple feedback instances associated with the differential CSI report. Accordingly, it may be desirable to provide techniques that can accurately capture the channel fading behavior when using differential CSI reporting.

Certain aspects of the present disclosure provide techniques and apparatus for configuring differential CSI reporting. More specifically, techniques presented herein may enable the UE to report differential CSI feedback in multiple different modes. For example, the UE may be configured to report aperiodic differential CSI feedback, periodic differential CSI feedback, a single instance of differential CSI feedback (e.g., without a period), periodic non-differential CSI feedback and differential CSI feedback, etc. Additionally, techniques presented herein may enable the UE to accurately reflect the channel fading behavior (e.g., of the channel) when reporting aperiodic differential CSI feedback and periodic differential CSI feedback.

Figure 9:
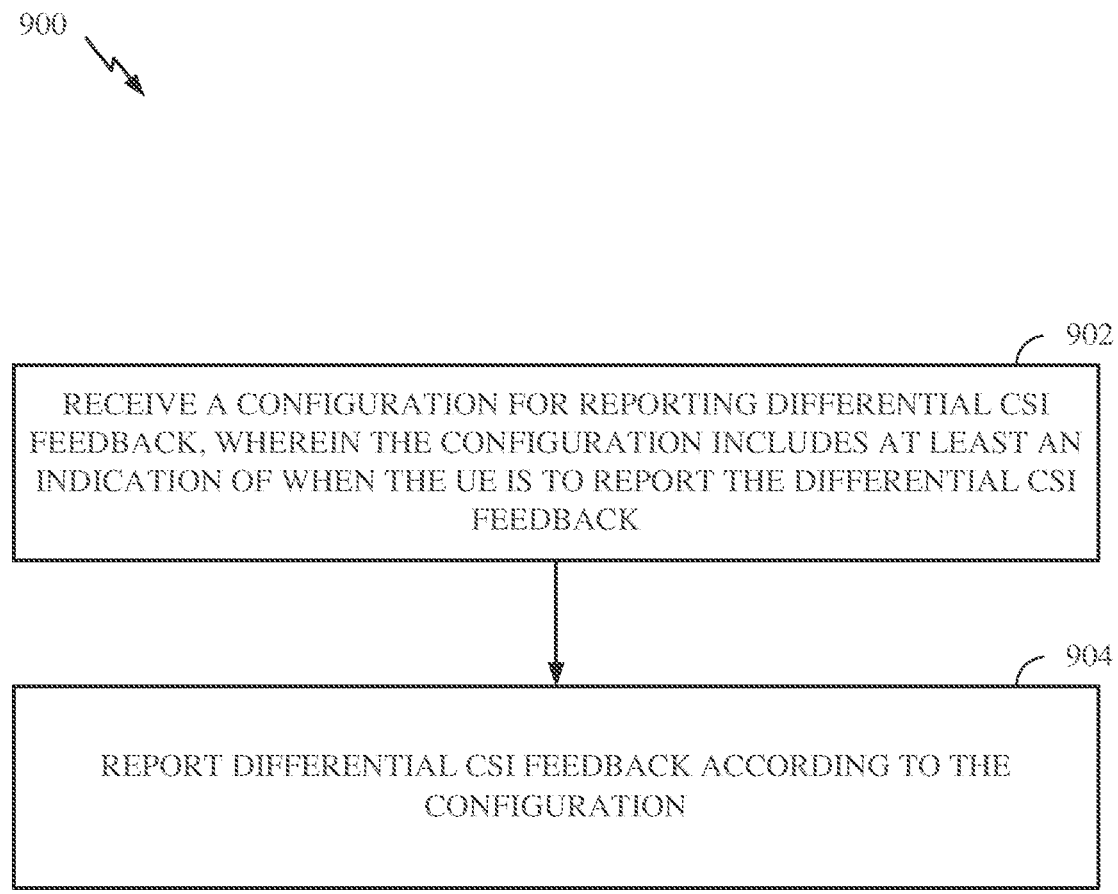
FIG. 9 is a flow diagram illustrating example operations that may be performed by a UE, for differential channel state information (CSI) feedback reporting, in accordance with certain aspects of the present disclosure.

FIG. 9 is a flow diagram illustrating example operations 900 that may be performed, for example, by a UE (e.g., UE 120), for reporting differential CSI feedback, in accordance with certain aspects of the present disclosure.

Operations 900 may begin, at 902, where the UE receives (e.g., via RRC signaling, downlink control information (DCI) signaling, etc.) a configuration (e.g., from a BS, such as BS 110) for reporting differential CSI feedback (e.g., a differential CSI feedback reporting configuration). The configuration includes at least an indication of when the UE is to report the differential CSI feedback. For example, the indication may trigger the UE to report aperiodic differential CSI feedback, periodic differential CSI feedback, non-periodic differential CSI feedback, periodic non-differential CSI feedback and differential CSI feedback, etc. At 904, the UE reports the differential CSI feedback according to the configuration. In some aspects, the UE may report differential CSI feedback by determining the feedback components associated with the particular CSI feedback stage of the differential CSI feedback reporting (e.g., first feedback components for the first CSI feedback stage, second feedback components for the second CSI feedback stage, and so on), generating a message that includes the feedback components, and/or transmitting the message.

FIG. 10 is a flow diagram illustrating example operations 1000 that may be performed, for example, by a BS (e.g., BS 110), for configuring a UE to report differential CSI feedback, in accordance with certain aspects of the present disclosure. Operations 1000 may begin, at 1002, where the BS determines a first (differential CSI feedback) configuration for a UE (e.g., UE 120) to use for reporting differential CSI feedback. At 1004, the BS signals (e.g., via RRC signaling, DCI signaling, etc.) the first configuration to the UE. The first configuration includes at least an indication of when the UE is to report differential CSI feedback. For example, the indication may trigger the UE to report aperiodic differential CSI feedback, periodic differential CSI feedback, non-periodic differential CSI feedback, periodic non-differential CSI feedback and differential CSI feedback, etc.

In some aspects, the BS may configure the UE with the codebook parameters of the differential higher resolution ($2^{nd}$ to $m^{th}$) CSI feedback. For example, the BS may signal an indication of one or more codebook parameters for the UE to use for the differential higher resolution CSI (e.g., the at least one second ($2^{nd}$ to $m^{th}$) CSI feedback). The codebook parameters may include the maximum supported rank ($RI_{x\_max}$) for the at least one second CSI feedback stage, the number of stages of the higher resolution CSI (e.g., x−1), the number of feedback beams N, for each stage (e.g., $N_1=1$, $N_2=2$, $N_3=1$, resulting in a 4 beam combination), power weighting for each stage, cophasing indication for each stage, etc. The UE may determine the higher resolution CSI based on the previous lower resolution CSI and the configured differential higher resolution CSI codebook, and report the higher resolution CSI to the BS.

According to certain aspects, techniques presented herein can be used to configure the UE to report aperiodic differential CSI feedback to the BS. For example, the codebook configuration (for differential CSI feedback) may include an indication that triggers the UE to transmit an aperiodic differential CSI feedback report. In response to the indication, the UE may transmit an aperiodic differential CSI feedback report to the BS.

Figure 11:
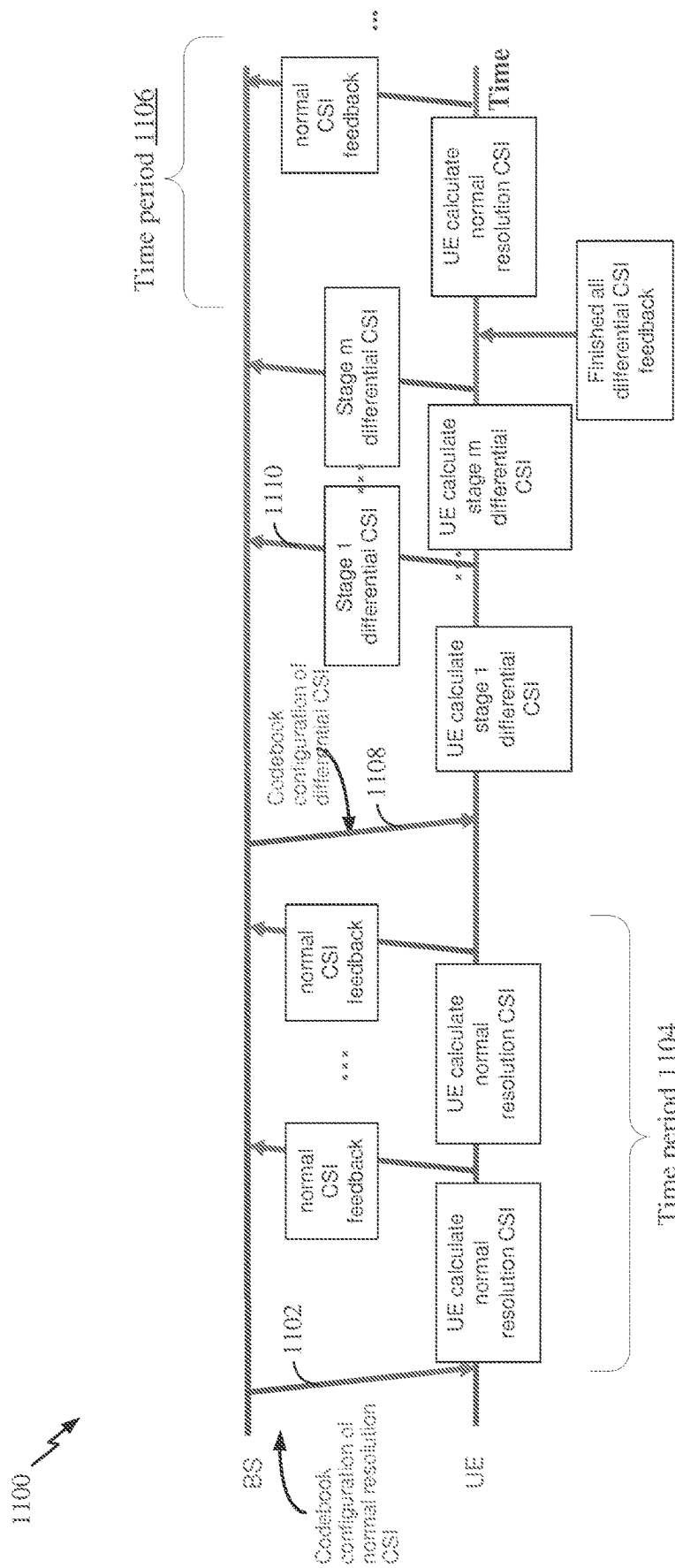
FIG. 11 is a call flow diagram illustrating example signaling for periodic non-differential CSI feedback reporting and differential CSI feedback reporting, in accordance with certain aspects of the present disclosure.

FIG. 11 is a call flow diagram 1100 illustrating example signaling for periodic non-differential (e.g., normal resolution) CSI feedback reporting and aperiodic differential CSI feedback reporting, according to certain aspects of the present disclosure.

At 1102, the BS signals/transmits an indication of a first codebook configuration triggering the UE to periodically report non-differential CSI feedback over one or more time periods (e.g., time periods 1104 and 1106). After time period 1104, the BS (at 1108) signals an indication of a second codebook configuration triggering the UE to transmit an aperiodic differential CSI feedback report. In response to the indication, the UE (at 1110) begins transmitting a differential CSI feedback report (e.g., using codebook parameters indicated in the second codebook configuration). As shown, transmitting differential CSI feedback may include transmitting multiple CSI feedback reports for one or more CSI feedback stages/instances (e.g., stage 1 to stage m). After the UE has finished transmitting the last CSI feedback associated with the last CSI feedback stage (e.g., stage m) of the differential CSI feedback report, the UE resumes reporting non-differential CSI feedback (e.g., during time period 1106).

The aperiodic differential CSI feedback report may include first feedback components associated with a first CSI feedback stage (e.g., stage 1) and second feedback components associated with at least one second CSI feedback stage (e.g., stage 2 to stage m). In some aspects, the UE may skip the stage 1 differential CSI feedback and replace it with the last normal CSI feedback (e.g., the last normal resolution CSI feedback of the periodic non-differential CSI feedback reporting). That is, the first feedback components associated with the first CSI feedback stage may be replaced by the non-differential CSI feedback reported in the previous time period. The UE may be configured (e.g., by the BS) via the first and/or second codebook configuration to skip and replace the stage 1 differential CSI feedback. Note that while FIG. 11 depicts the BS transmitting (and the UE receiving) the second codebook configuration (triggering the UE to report differential CSI feedback) after the first time period 1104, the BS can transmit the second codebook configuration after any number of time periods of the non-differential CSI feedback reporting.

According to certain aspects, the techniques presented herein can be used to configure the UE to periodically report non-differential CSI feedback and differential CSI feedback to the BS. For example, the UE may receive a codebook configuration (for both normal resolution CSI feedback and differential CSI feedback) with an indication that triggers the UE to periodically transmit non-differential CSI feedback and differential CSI feedback over one or more time periods. In response to the indication, the UE may periodically transmit, during each of the one or more time periods, one or more non-differential CSI feedback reports and a differential CSI feedback report.

Figure 12:
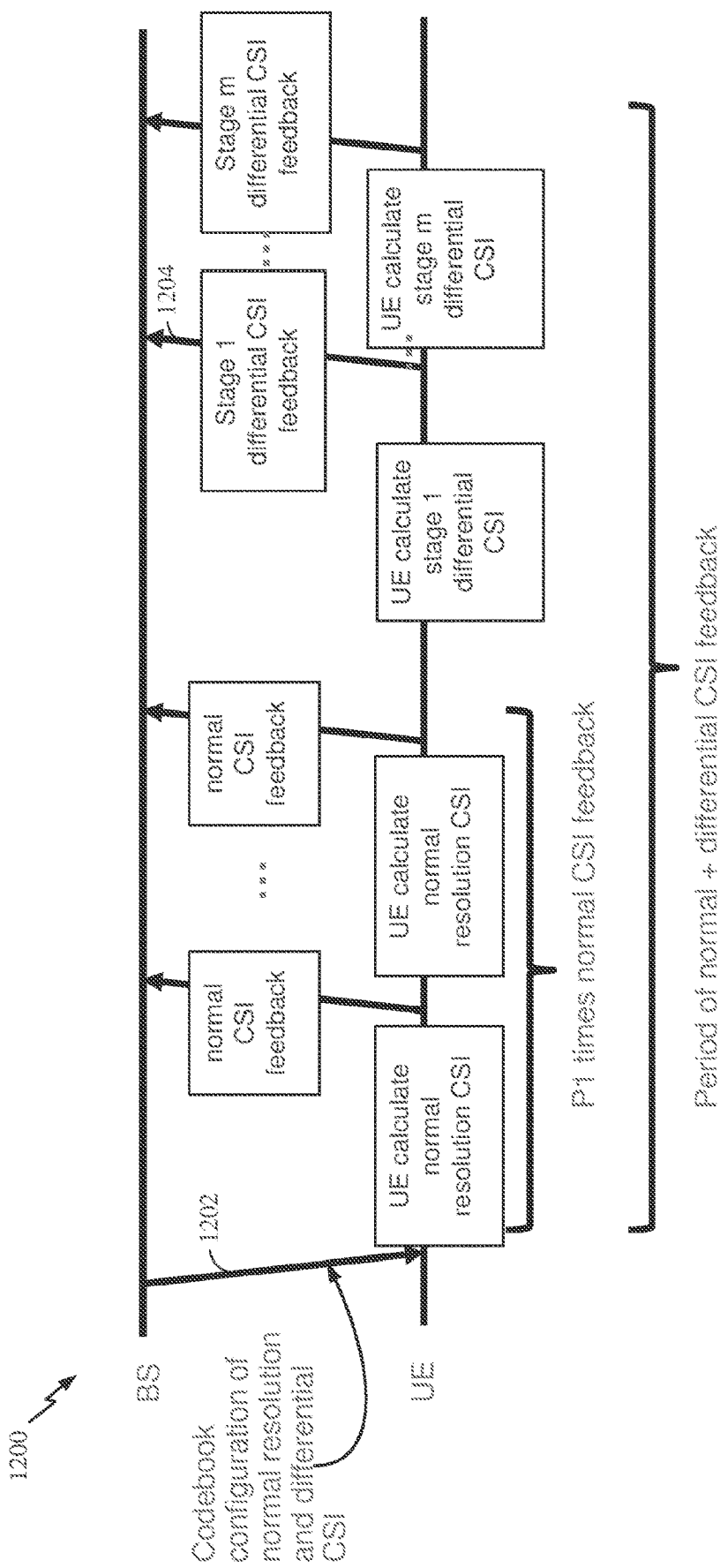
FIG. 12 is a call flow diagram illustrating example signaling for periodic non-differential CSI feedback reporting and differential CSI feedback reporting, in accordance with certain aspects of the present disclosure.

FIG. 12 is a call flow diagram 1200 illustrating example signaling for periodic non-differential (e.g., normal resolution) CSI feedback reporting and differential CSI feedback reporting, according to certain aspects of the present disclosure.

At 1202, the BS signals an indication of a codebook configuration triggering the UE to periodically transmit one or more non-differential CSI feedback reports and a differential CSI feedback report over one or more time periods. In some aspects, the codebook configuration (at 1202) may indicate the period (P1) of the non-differential (normal) CSI feedback reporting. For example, the codebook configuration can indicate whether there is a single period (P1=1) or multiple periods (P1>1) of normal resolution CSI feedback prior to one subsequent multi-stage differential CSI feedback. As shown, the UE (at 1204) begins reporting differential CSI feedback after the period for the normal CSI feedback ends. Similar to FIG. 11, in some aspects, the first feedback components associated with the stage 1 differential CSI feedback may be skipped and replaced by the feedback components of the last non-differential CSI feedback reported in the time period for normal CSI feedback.

According to certain aspects, techniques presented herein can be used to configure the UE to periodically report differential CSI feedback to the BS, which as noted above may not be supported by conventional Type-II CSI reporting designs. For periodic differential CSI feedback, the codebook configuration (for differential CSI feedback) may include an indication that triggers the UE to periodically transmit a differential CSI feedback report over one or more time periods. In response to the indication, the UE may transmit, during each time period, a differential CSI feedback report.

Figure 13:
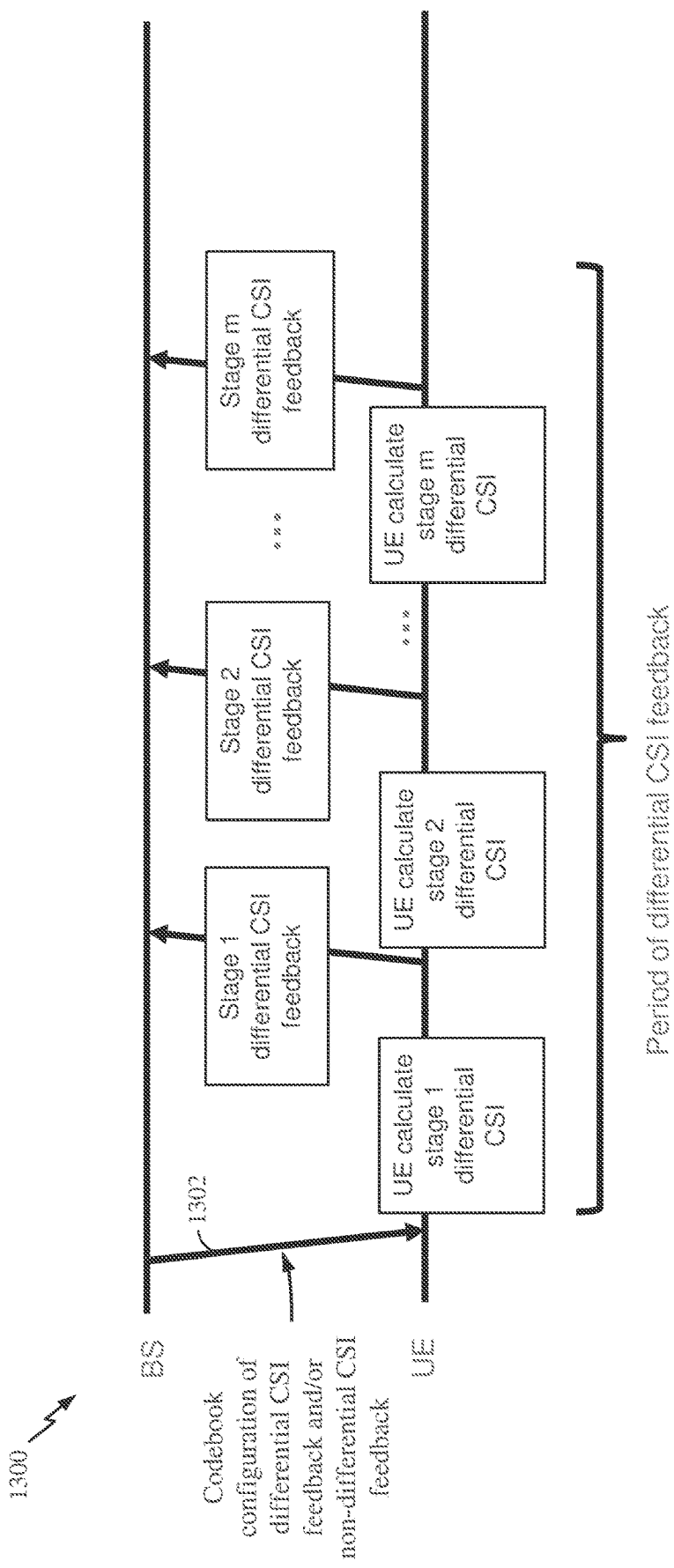
FIG. 13 is a call flow diagram illustrating example signaling for periodic differential CSI feedback reporting, in accordance with certain aspects of the present disclosure.

FIG. 13 is a call flow diagram 1300 illustrating example signaling for periodic differential (multi-stage) CSI feedback reporting, according to certain aspects of the present disclosure. As shown, at 1302, the BS signals an indication of a codebook configuration triggering the UE to periodically transmit a differential CSI feedback report. The codebook configuration may include an indication of the time period(s) for reporting differential CSI feedback. In some cases, this codebook configuration may also include a codebook configuration for non-differential (e.g., normal resolution) CSI feedback.

As noted above, it may not be possible with conventional differential CSI reporting techniques to capture the channel fading during the multiple feedback instances that occur over time. Accordingly, aspects presented herein provide techniques that enable the UE to update and/or replace channel feedback components when reporting differential CSI feedback in order to accurately reflect the channel fading behavior.

In certain aspects, when transmitting differential CSI feedback, the UE may be configured to update feedback components (that were reported during a previous CSI feedback stage) in a subsequent CSI feedback stage. For example, after transmitting a plurality of feedback components associated with one or more first CSI feedback stages, the UE may determine an updated feedback component for a first feedback component of the plurality of feedback components, and transmit the updated feedback component during a subsequent second CSI feedback stage.

In some aspects, the beam coefficients for linear combination (e.g., beam index, amplitude and/or phase) within one CSI instance may be updated during multiple stages of differential CSI feedback. In some cases, beam replacement during subsequent CSI feedback stages may also be supported. When the UE detects that the priority of updating CSI feedback in a given stage (e.g., stage x) is above a threshold (e.g., the UE detects that a change in channel quality between the BS and UE is above a threshold), the UE may skip the concurrent reporting of CSI feedback in later stages (e.g., stage x+1, stage x+2. etc.) by replacing the CSI feedback in these later stages with the updated CSI feedback for the given stage (e.g., stage x). In some aspects, the UE may determine the channel quality based on various measurements, such as signal to noise ratio (SNR), reference signal received power (RSRP), received signal strength indicator (RSSI), etc.

To enable CSI replacement, the UE may include a CSI indication (CI) in each CSI feedback report to indicate to the BS the particular CSI reporting instance/stage that corresponds to the CSI feedback report. For example, a CI=1 in a CSI feedback report may indicate that the CSI feedback report is for the $1^{st}$ CSI feedback stage, a CI=2 in a CSI feedback report may indicate that the CSI feedback report is for the $2^{nd}$ CSI stage, and so on. In any given CSI feedback stage, the beams including their associated coefficients (e.g., WB/SB amplitude scaling factors, phase) may be updated together. In some aspects, the dominant beam indication may be included in the first CSI feedback report (for the $1^{st}$ CSI feedback stage) and may not be included in subsequent CSI feedback reports for subsequent CSI feedback stages. Thus, if the first CSI reporting is updated, then the dominant beam may also be updated.

In some aspects, the UE may also include (in the CSI feedback report) a differential feedback rank indicator ($RI_x$) for CI. In one aspect, the differential feedback rank indicator may be carried in the first CSI feedback report ($RI_1$ for the $1^{st}$ CSI feedback stage) and may not be carried in subsequent CSI feedback reports (for subsequent CSI feedback stages). In this aspect, the RI for the subsequent CSI feedback reports may be the same as the first CSI feedback report.

In one aspect, the differential feedback rank indicator may be included in each CSI feedback report of the multiple CSI feedback stages. In this aspect, UE may also include a feedback rank indicator for CI to ensure that the CI with the larger CSI index has a lower rank that its previous reported rank of the lower CSI index. For example, the UE may include a feedback rank indicator ($RI_x$) for the CI=x, such that $RI_x>=RI_{x+1}$ and $RI_1<=R_{x-1}$.

In certain aspects, when replacing CSI within a differential CSI reporting period, there may be two options for the combined PMI with multiple CI. In a first option, if the $1^{st}$ to $n^{th}$ CSI instances had reported, and the concurrent updated CSI feedback report is the $x^{th}$ CSI feedback report (where $1<=x<=n$), then the $1^{st}$ to $x^{th}$ CSI feedback reports may be combined for the concurrent CSI feedback report. The CSI feedback reports of the $x+1^{th}$ to $n^{th}$ CSI instances may be treated as unreliable CSI feedback reports and discarded. In some aspects, for the first option, once CSI is combined, the consecutive CSI feedback reports of the differential CSI reporting within the period of total CSI feedback reports may be x+1, x+2, . . . until the CSI reporting period is reached. In a second option, only the $x^{th}$ CSI feedback report may be replaced and combined with $1^{st}$ to x−1 and $x+1^{th}$ to $n^{th}$ CSI for the concurrent CSI feedback report.

Consider the following reference example where codebook $W=W_1^1W_2^1+W_1^2W_2^2+ \ldots +W_1^mW_2^m$. In this example, there may no beam replacement within a total of m CSI feedback reporting instances. Now assume, in another example, that the $n^{th}$ (where m>n>x) CSI feedback report is already tied back, and the generated PMI is $W=W_1^1W_2^1+W_1^2W_2^2+\ldots+W_1^nW_2^n$. If the UE detects that the $x^{th}$ CSI feedback report should be updated (e.g., the UE has a better estimate of the channel components associated with the $x^{th}$ CSI feedback report that may provide better performance in terms of throughput, capacity, etc.), the UE may feedback a CSI indicator (CI) of x in a subsequent CSI feedback report that includes the updated $W_1^xW_2^x$.

In this case, there may be two options for the updated PMI definition. In a first option, $W=W_1^1W_2^1+ \ldots W_1^xW_2^x$ and the BS may use the updated W by detecting that CI=x, where x<n. As noted above, in this first option, the $x+1^{th}$ to $n^{th}$ CSI feedback reports (e.g., $W_1^{x+1}W_2^{x+1} \ldots W_1^nW_2^n$) may be treated as unreliable and discarded. In some cases, the rest of the CI for the consecutive CSI feedback reports (e.g., after the CSI is combined) may follow the sequence of x+1, x+2 . . . until the end of the differential CSI feedback reporting period.

In the second option, $W=W_1^1W_2^1+ \ldots +W_1^xW_2^x+ \ldots +W_1^nW_2^n$. As noted above, in this second option, only the $x^{th}$ CSI feedback report is replaced. The updated $x^{th}$ CSI feedback report is then combined with the $1^{st}$ to $x-1^{th}$ and $x+1^{th}$ to $n^{th}$ CSI for the concurrent CSI feedback report. In certain aspects, the first option may be chosen in fast-changing channel conditions (e.g., above a threshold). In certain aspects, the second option may be chosen in when the channel conditions are relatively static (e.g., below a threshold).

Figure 14:
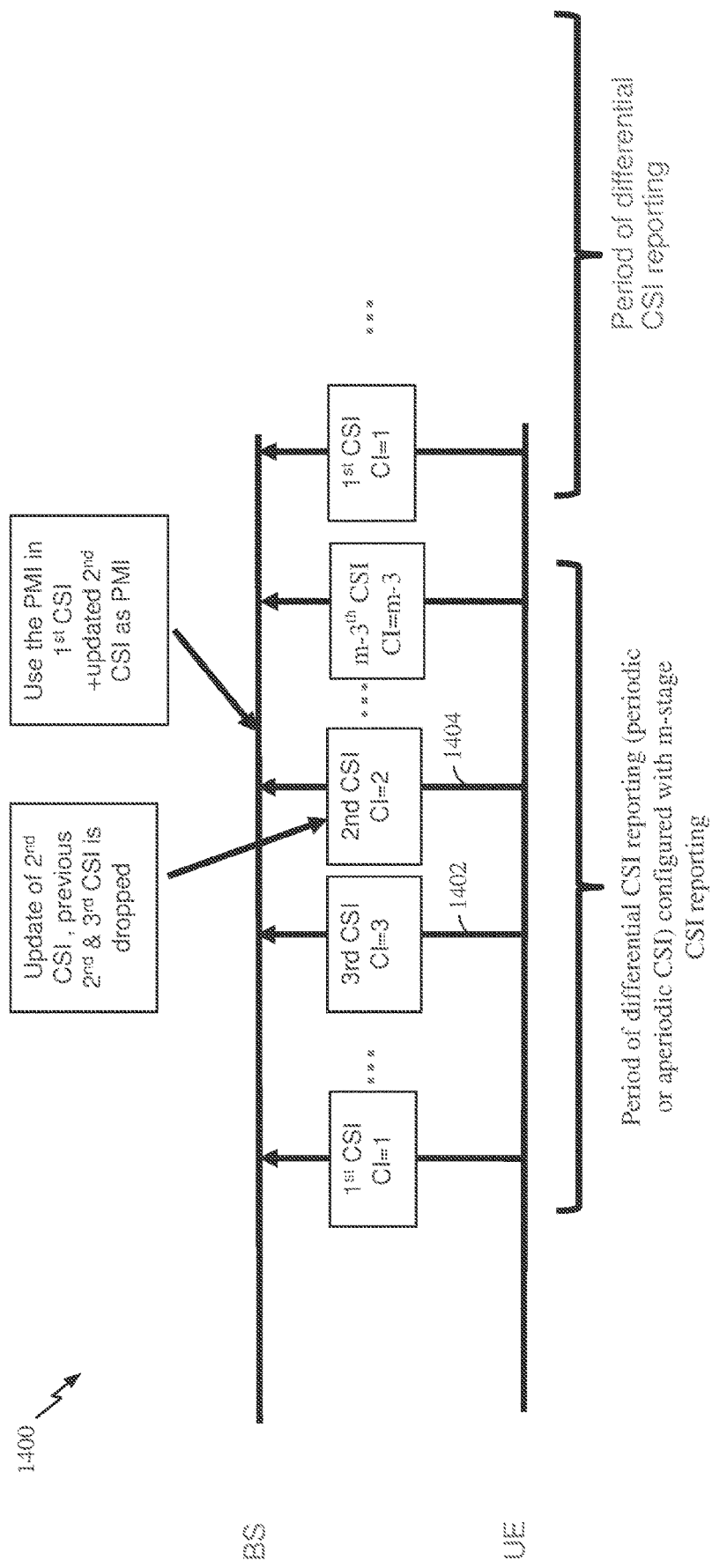
FIG. 14 is a call flow diagram illustrating an example of CSI replacement for differential CSI feedback reporting, in accordance with certain aspects of the present disclosure.

FIG. 14 is a call flow diagram 1400 illustrating an example of CSI replacement for differential CSI feedback reporting where the PMI is updated according to the first option described herein, according to certain aspects of the present disclosure. Note that this example of CSI replacement may be used for aperiodic differential CSI reporting and/or periodic differential CSI reporting.

As shown, after the UE (at 1402) reports the $3^{rd}$ CSI feedback report (e.g., CSI feedback stage 3), the UE may determine to update the $2^{nd}$ CSI feedback report (e.g., reported during CSI feedback stage 2). At 1404, the UE drops the previous $2^{nd}$ and $3^{rd}$ CSI feedback reports and sends an update of the $2^{nd}$ CSI feedback report with a CI=2 to the BS. As shown, the updated $2^{nd}$ CSI feedback report is sent instead of (e.g., replaces) the fourth CSI feedback report. Once received by the BS, the BS may use the PMI in the $1^{st}$ CSI feedback report and the updated $2^{nd}$ CSI feedback report as PMI.

Figure 15:
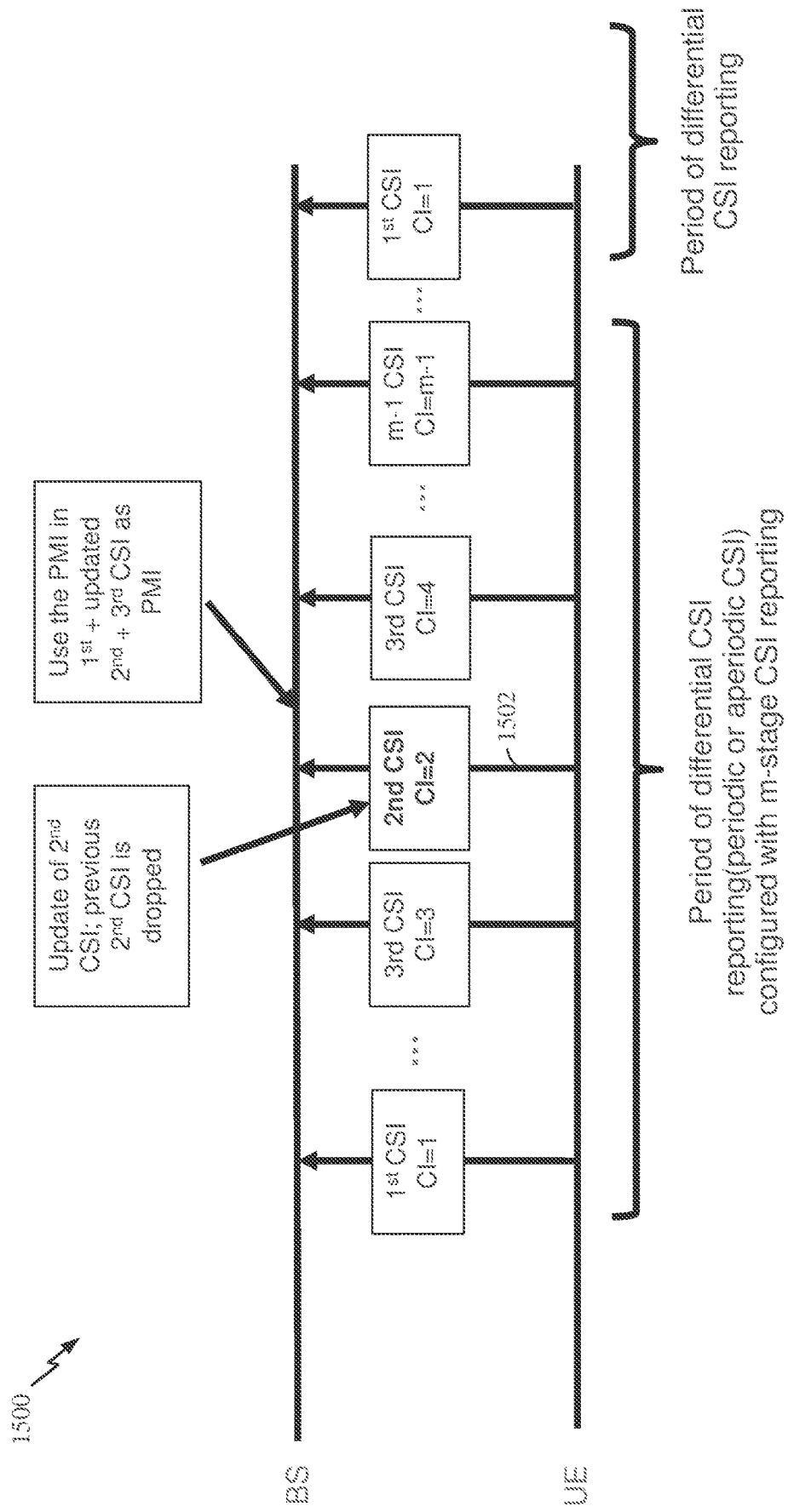
FIG. 15 is a call flow diagram illustrating another example of CSI replacement for differential CSI feedback reporting, in accordance with certain aspects of the present disclosure.

FIG. 15 is a call flow diagram 1500 illustrating an example of CSI replacement for differential CSI feedback where the PMI is updated according to the second option described herein, according to certain aspects of the present disclosure. Note that this example of CSI replacement may be used for aperiodic differential CSI reporting and/or periodic differential CSI reporting.

As shown, once the UE determines to update the $2^{nd}$ CSI feedback report (e.g., reported during CSI feedback stage 2), the UE (at 1502) drops the previous $2^{nd}$ CSI feedback report and sends an update of the $2^{nd}$ CSI feedback report with a CI=2 to the BS. As shown, the updated $2^{nd}$ CSI feedback report is sent instead of (e.g., replaces) the fourth CSI feedback report. Once received by the BS, the BS may use the PMI in the $1^{st}$ CSI feedback report the updated second CSI feedback report and the $3^{rd}$ CSI feedback report as PMI.

According to certain aspects, techniques presented herein may use a beam indication to enable CSI replacement for (periodic or aperiodic) differential CSI feedback reporting. For example, in some aspects, if the beam indicator in the $x^{th}$ CSI feedback reporting instance represents the same DFT basis which exists in the previous $1^{st}$ to $x-1^{th}$ CSI feedback reporting instances, then an update of the beam coefficients for the $x^{th}$ CSI feedback report may be triggered.

Consider, for example, the following scenario where rank 1 is reported and the precoder structure in (3) is used, where L=4, the number of CSI feedback reports=2, and each CSI feedback report includes two beams' feedback. In this example, assume that beams i=0 and 1 are fed back in the first CSI feedback report (e.g., during the 1st CSI feedback stage) and that beams i=2 and 3 are fed back in the second CSI feedback report (e.g., during the $2^{nd}$ CSI feedback stage). In this scenario, if $b_{k_1^{(2)}k_2^{(2)}} = b_{k_1^{(1)}k_2^{(1)}}$, then $p_{r,l,1}^{(SB)}$, $p_{r,l,1}^{(SB)} c_{r,l,1}$ may be updated as the coefficients in second CSI feedback report. In some cases, if $b_{k_1^{(2)}k_2^{(2)}} = b_{k_1^{(1)}k_2^{(1)}}$, and $p_{r,l,2}^{(WB)} = 0$, then it may be assumed that the third beam (e.g., i=2) is deleted.

Figure 16:
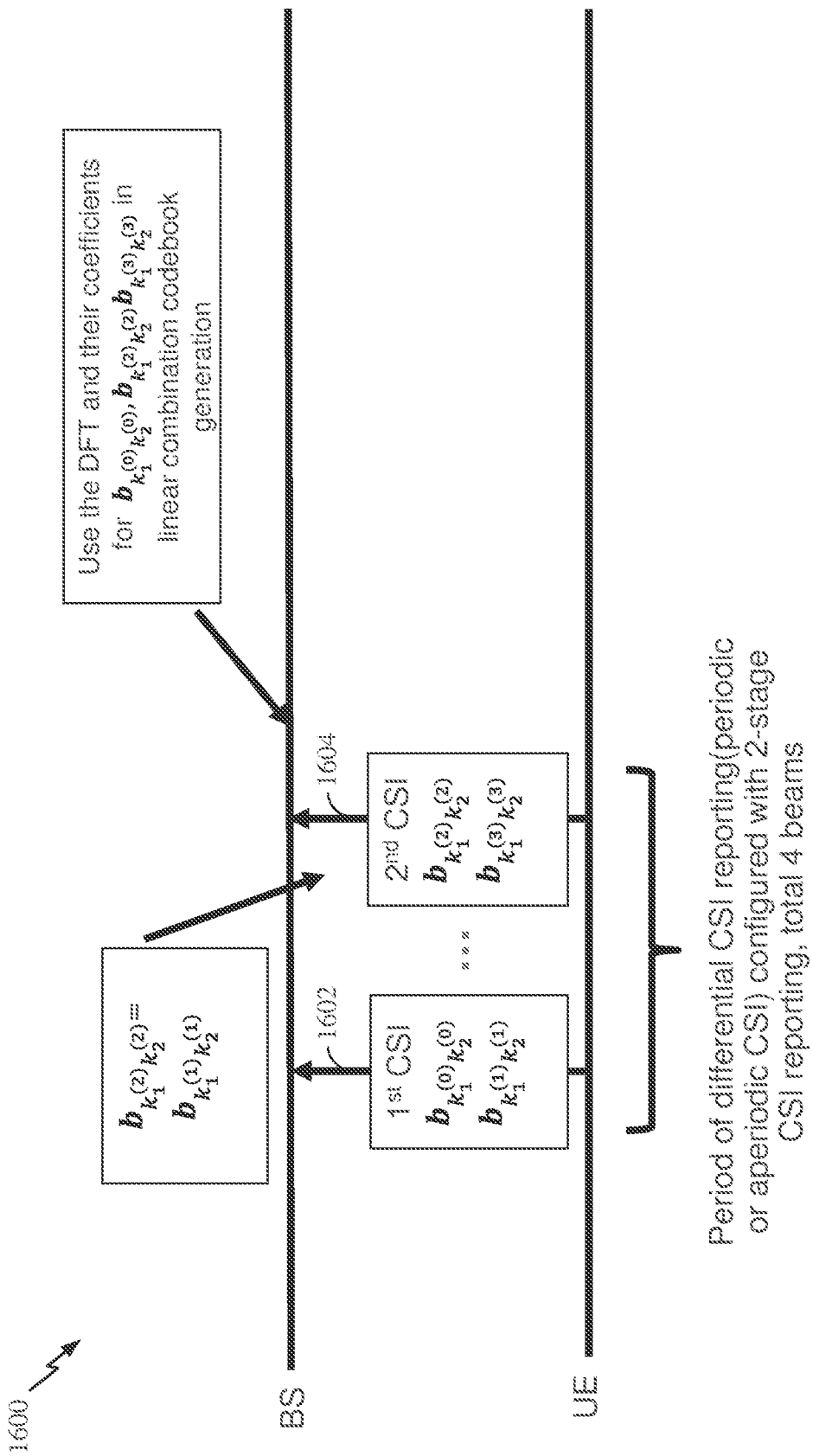
FIG. 16 is a call flow diagram illustrating an example of using a beam indication to trigger CSI replacement for differential CSI feedback reporting, in accordance with certain aspects of the present disclosure.

FIG. 16 is a call flow diagram 1600 illustrating an example of using a beam indication to enable CSI replacement for differential CSI feedback reporting, according to certain aspects of the present disclosure. In this example, a single beam may be updated per feedback. Note that this example of CSI replacement may be used for aperiodic differential CSI reporting and/or periodic differential CSI reporting.

As shown, at 1602, the UE includes the first and second beam (i=0, 1) indications in the first CSI feedback report, and at 1604, includes the second and third beam indications (i=2, 3) in the second CSI feedback report. In the second CSI feedback report, the UE may set $b_{k_1^{(2)}k_2^{(2)}} = b_{k_1^{(1)}k_2^{(1)}}$ in order to trigger an update of the coefficients for beam i=1. As shown, once the second CSI feedback report is received by the BS, the BS uses the DFT and coefficients for $b_{k_1^{(0)}k_2^{(0)}}$, $b_{k_1^{(2)}k_2^{(2)}}$, $b_{k_1^{(3)}k_1^{(3)}}$ in the linear combination codebook generation.

In some aspects, the UE may be configured to report a single differential CSI feedback report (e.g., without a periodicity) to the BS.

Figure 17:
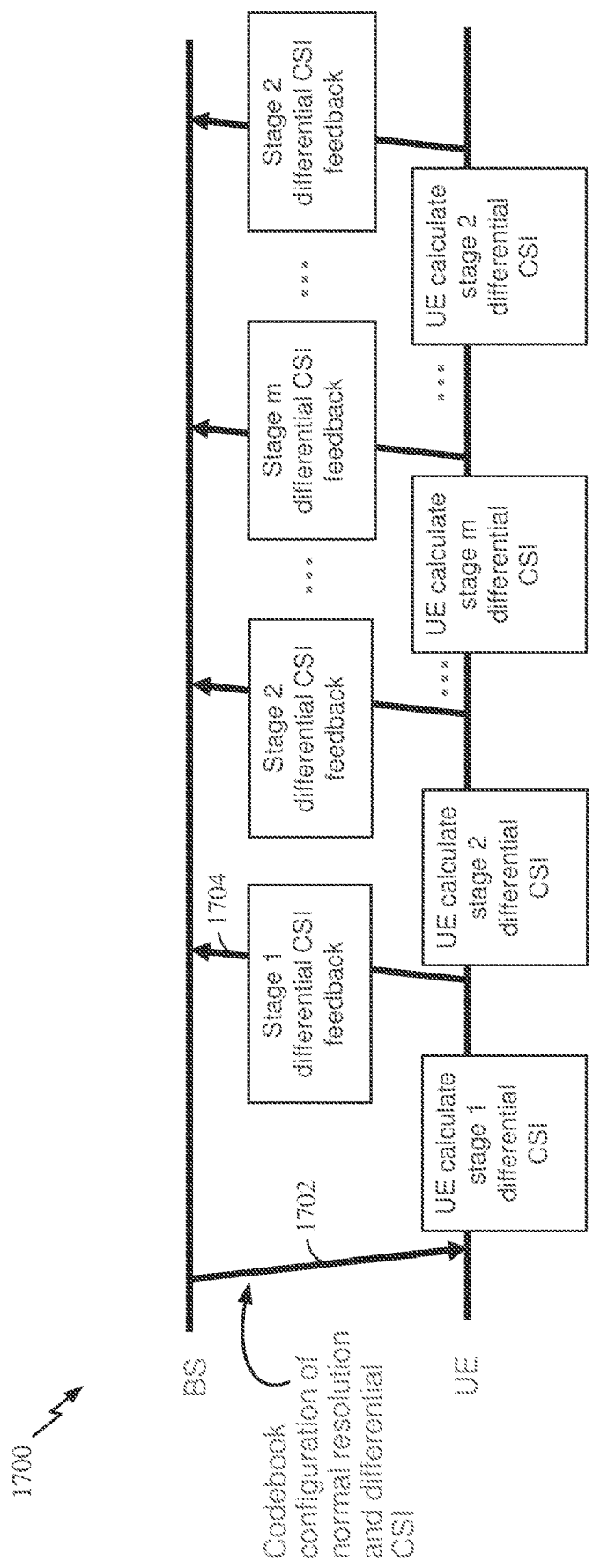
FIG. 17 is a call flow diagram illustrating example signaling for reporting a single differential CSI feedback report, in accordance with certain aspects of the present disclosure.

FIG. 17 is a call flow diagram 1700 illustrating example signaling for reporting a single differential CSI feedback report, according to certain aspects of the present disclosure. As shown, at 1702, the BS signals an indication of a codebook configuration for the single differential CSI feedback report. In response to the indication, the UE (at 1704) may begin transmitting CSI feedback over multiple CSI feedback stages.

As noted above, techniques presented herein may also provide for CSI replacement in the situation of a single differential CSI report (e.g., without a periodicity). The CSI replacement for a single differential CSI report may be similar to the case of CSI replacement with periodicity. For example, when CSI is reported with $CI_n < CI_{n-1}$, the corresponding part of the PMI may have to be updated, w here $CI_n$ is the CI in slot n and $CI_{n-1}$ is the CI in slot n-1. However, in some cases, compared to the CSI replacement with periodicity, the maximum CI may be restricted below a threshold (e.g., CI<4). In some cases, the rank (e.g., RI) can be earned in the first CSI feedback report and may not be earned in subsequent CSI feedback reports (e.g., the subsequent CSI feedback reports may have the same RI as the first CSI feedback report). In some cases, when the first CSI report is replaced, the rank may be updated accordingly.

Figure 18:
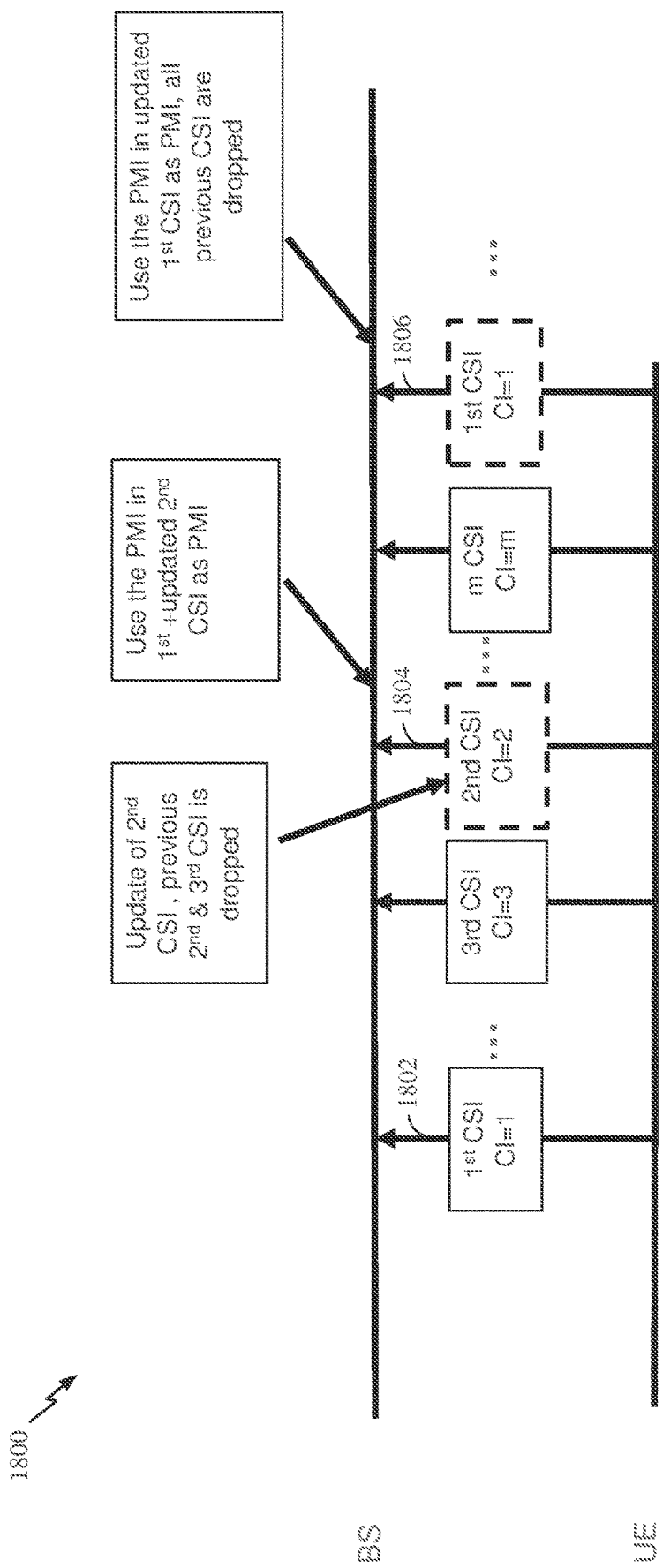
FIG. 18 is a call flow diagram illustrating an example of CSI replacement in the case of a single differential CSI feedback report, in accordance with certain aspects of the present disclosure.

FIG. 18 is a call flow diagram 1800 illustrating an example of CSI replacement (in the case of no periodicity) for a single differential CSI feedback report where the PMI is updated according to the first option described herein, according to certain aspects of the present disclosure.

As shown, after the UE (at 1802) reports the $3^{rd}$ CSI feedback report (e.g., CSI feedback stage 3) the UE may determine to update the $2^{nd}$ CSI feedback report (e.g., reported during CSI feedback stage 2). At 1804, the UE drops the previous $2^{nd}$ and $3^{rd}$ CSI feedback reports and sends an update of the $2^{nd}$ CSI feedback report with a CI=2 to the BS. Once received by the BS, the BS may use the PMI in the $1^{st}$ CSI feedback report and the updated $2^{nd}$ CSI feedback report as PMI. After transmitting the m stage CSI, the UE may determine to update the previous $1^{st}$ CSI feedback report. As shown, at 1806, the UE sends an update of the $1^{st}$ CSI feedback report with a CI=1 to the BS. All the previous CSI feedback reports are dropped. Once received, the BS may use the PMI in the updated $1^{st}$ CSI feedback report as PMI.

Figure 19:
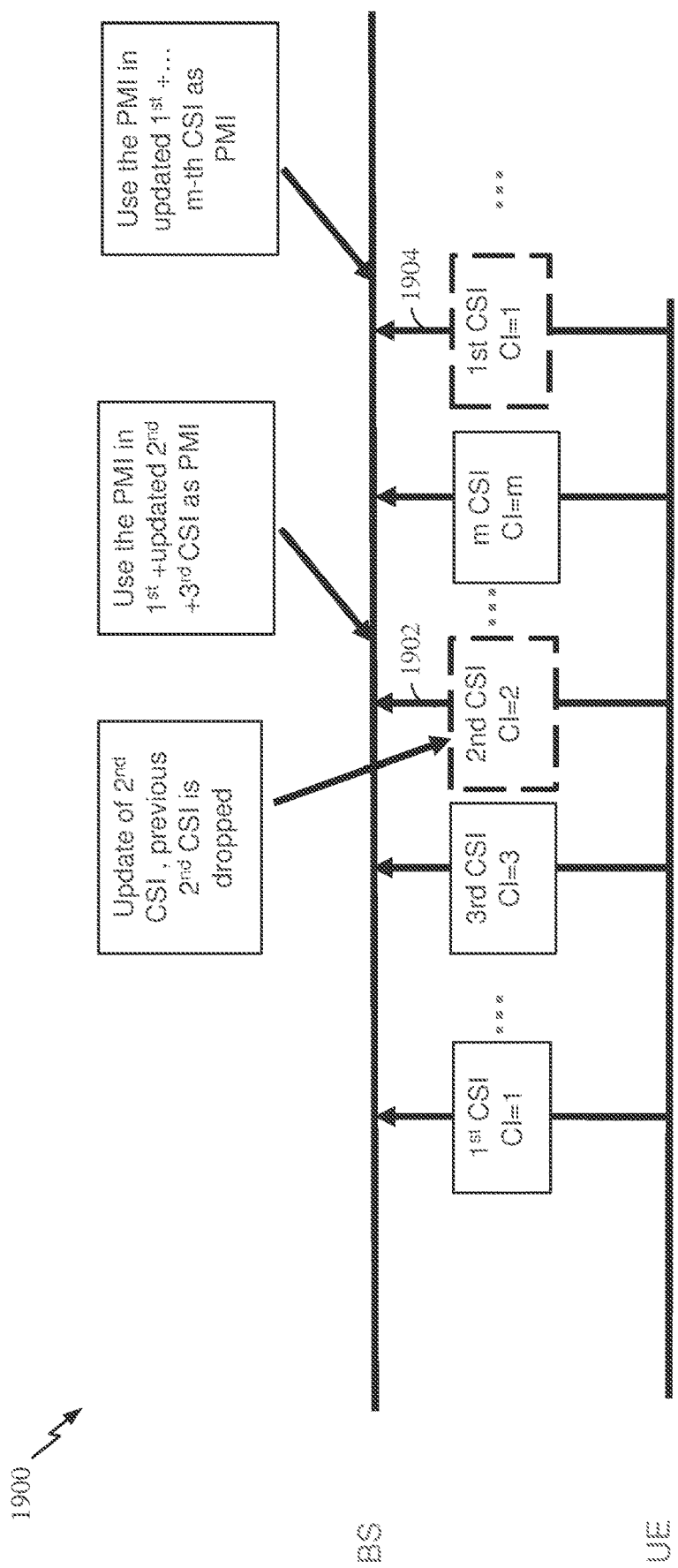
FIG. 19 is a call flow diagram illustrating another example of CSI replacement in the case of a single differential CSI feedback report, in accordance with certain aspects of the present disclosure.

FIG. 19 is a call flow diagram 1900 illustrating an example of CSI replacement (in the case of no periodicity) for a single differential CSI feedback report where the PMI is updated according to the second option described herein, according to certain aspects of the present disclosure.

As shown, once the UE determines to update the $2^{nd}$ CSI feedback report (e.g., CSI feedback stage 2), the UE (at 1902) drops the previous $2^{nd}$ CSI feedback report and sends an update of the $2^{nd}$ CSI feedback report with a CI=2 to the BS. Once received by the BS, the BS uses the PMI in the $1^{st}$ CSI feedback report, the updated second CSI feedback report and the $3^{rd}$ CSI feedback report as PMI. After transmitting the m stage CSI, the UE may determine to update the previous $1^{st}$ CSI feedback report. At 1904, the UE sends an update of the $1^{st}$ CSI feedback report with a CI=1 to the BS. Instead of dropping all previous CSI feedback reports, the BS may use the PMI in the updated $1^{st}$ CSI feedback report to the $m^{th}$ CSI feedback report as PMI.

Advantageously, the techniques presented herein provide improved techniques for configuring differential CSI reporting that can be used to accurately reflect channel fading during differential CSI reporting. Further, the differential CSI reporting techniques described herein can be used to provide high resolution CSI while reducing the amount of per feedback overhead typically associated with reporting high resolution CSI.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c. a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone: C alone; A and B in combination; A and C in combination; B and C in combination; or A, B, and C in combination.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software components) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for feeding back, means for reporting, means for performing, means for calculating, means for generating, means for adding, means for preceding, means for (periodic, aperiodic, etc.) transmitting, means for receiving, means for sending, means for refraining, means for indicating, means for setting, means for signaling, means for configuring, means for replacing, means for updating, means for selecting, means for triggering, means for applying, means for weighting, means for conveying, means for identifying, and/or means for decoding may include a processing system, which may include one or more processors or other elements, such as the transmit processor 464, the controller/processor 480, the receive processor 458, and/or antenna(s) 452 of the user equipment 120 illustrated in FIG. 4, and/or the transmit processor 420, the controller/processor 440, the receive processor 438, and/or antenna(s) 434 of the base station 110 illustrated in FIG. 4.

Means for transmitting, means for sending, means for signaling, means for indicating, means for reporting, means for triggering, means for configuring, means for communicating, means for feeding back and/or means for conveying may include a transmitter, which may include a transmit processor 464, MOD(s) 454, and/or antenna(s) 452 of the user equipment 120 illustrated in FIG. 4, and/or the transmit processor 420, MOD(s) 432, and/or antenna(s) 434 of the base station 110 illustrated in FIG. 4. Means for receiving and/or means for communicating may include a receiver, which may include receiver processor 458, DEMOD(s) 454, and/or antenna(s) 452 of the user equipment 120 illustrated in FIG. 4, and/or the receive processor 438, MOD(s) 432, and/or antenna(s) 434 of the base station 110.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
receiving a configuration for reporting differential channel state information (CSI) feedback, wherein the configuration comprises at least an indication of when the UE is to report the differential CSI feedback; and
reporting differential CSI feedback according to the configuration, wherein reporting the differential CSI feedback comprises transmitting a differential CSI feedback report, wherein transmitting the differential CSI feedback report comprises:
transmitting a plurality of feedback contents associated with at least one of a first CSI feedback stage or a second CSI feedback stage of the differential CSI feedback report, the second CSI feedback stage being subsequent to the first CSI feedback stage;
after transmitting the plurality of feedback contents, determining an updated feedback content for a first feedback content of the plurality of feedback contents, the first feedback content being associated with the first CSI feedback stage; and
transmitting the updated feedback content during a subsequent third CSI feedback stage of the differential CSI feedback report, wherein the transmitted updated feedback content overrides the first feedback content and overrides a third feedback content associated with the third CSI feedback stage.

2. The method of claim 1, wherein:
the differential CSI feedback report is an aperiodic differential CSI feedback report;
the indication triggers the UE to transmit the aperiodic differential CSI feedback report; and
reporting differential CSI feedback comprises transmitting the aperiodic differential CSI feedback report in response to the indication.

3. The method of claim 2, further comprising:
periodically transmitting one or more non-differential CSI feedback reports over one or more time periods prior to receiving the configuration.

4. The method of claim 3, wherein:
at least one feedback content associated with an initial CSI feedback stage of the differential CSI feedback report is skipped and overridden by one of the one or more non-differential CSI feedback reports transmitted in the one or more time periods, wherein each of the CSI feedback stages refers to a different instance in time in which the UE reports the corresponding differential CSI feedback.

5. The method of claim 1, wherein:
the indication triggers the UE to periodically transmit at least one non-differential CSI feedback report and the differential CSI feedback report over one or more time periods; and
reporting differential CSI feedback comprises transmitting, during each of the one or more time periods, the at least one non-differential CSI feedback report and the differential CSI feedback report.

6. The method of claim 5, wherein:
the differential CSI feedback report is transmitted after the at least one non-differential CSI feedback report is transmitted during each of the time periods.

7. The method of claim 6, wherein:
at least one feedback content associated with an initial CSI feedback stage of the differential CSI feedback report is skipped and overridden by one of the at least one non-differential CSI feedback report transmitted in each time period, wherein each of the CSI feedback stages refers to a different instance in time in which the UE reports the corresponding differential CSI feedback.

8. The method of claim 1, wherein:
the indication triggers the UE to periodically transmit the differential CSI feedback report over one or more time periods; and
reporting differential CSI feedback comprises transmitting, during each time period, the differential CSI feedback report.

9. The method of claim 1, further comprising:
signaling an indication of one of the first CSI feedback stage that corresponds to the updated feedback content.

10. The method of claim 1, wherein the transmitted updated feedback content further overrides one or more second feedback contents of the plurality of feedback contents transmitted after the first feedback content.

11. The method of claim 1, wherein:
the differential CSI feedback report is a single differential CSI feedback report;
the indication triggers the UE to transmit the single differential CSI feedback report; and
reporting differential CSI feedback comprises transmitting the single differential CSI feedback report in response to the indication.

12. A method for wireless communication by a base station (BS), comprising:
determining a first configuration for a user equipment (UE) to use for reporting differential channel state information (CSI) feedback;
signaling the first configuration to the UE, wherein the first configuration comprises at least an indication of when the UE is to report differential CSI feedback, wherein the differential CSI feedback comprises a differential CSI feedback report;
receiving a plurality of feedback contents associated with at least one of a first CSI feedback stage or a second CSI feedback stage of the differential CSI feedback report, the second CSI feedback stage being subsequent to the first CSI feedback stage;
after receiving the plurality of feedback contents, receiving an updated feedback content for a first feedback content of the plurality of feedback contents during a subsequent third CSI feedback stage of the differential CSI feedback report, the first feedback content being associated with the first CSI feedback stage and overriding a third feedback content associated with the third CSI feedback stage;
overriding the first feedback content with the updated feedback content; and
determining a precoding to use for multiple input multiple output (MIMO) communications based in part on the updated feedback content.

13. The method of claim 12, wherein the differential CSI feedback report is an aperiodic differential CSI feedback report and the first configuration triggers the UE to transmit an aperiodic differential CSI feedback report.

14. The method of claim 13, further comprising:
determining a second configuration for the UE to use for reporting non-differential CSI feedback; and
signaling the second configuration to the UE, wherein the second configuration triggers the UE to periodically transmit non-differential CSI feedback over one or more time periods.

15. The method of claim 14, wherein the first configuration is signaled after receiving non-differential CSI feedback in at least one of the time periods.

16. The method of claim 15, wherein an initial CSI feedback stage of the differential CSI feedback report comprises the non-differential CSI feedback received in the at least one of the time periods.

17. The method of claim 12, wherein the first configuration triggers the UE to periodically transmit at least one non-differential CSI feedback report and the differential CSI feedback report over one or more time periods.

18. The method of claim 12, wherein the indication triggers the UE to periodically transmit the differential CSI feedback report over one or more time periods.

19. The method of claim 12, wherein the updated feedback content further comprises an indication of the first feedback content that corresponds to the updated feedback content.

20. An apparatus for wireless communications, comprising:
at least one processor configured to:
obtain a configuration for reporting differential channel state information (CSI) feedback, wherein the configuration comprises at least an indication of when the apparatus is to report the differential CSI feedback; and
report differential CSI feedback according to the configuration, wherein reporting differential CSI feedback comprises outputting a differential CSI feedback report for transmission, wherein outputting the differential CSI feedback report for transmission comprises:
outputting a plurality of feedback contents associated with at least one of a first CSI feedback stage or a second CSI feedback stage of the differential CSI feedback report for transmission, the second CSI feedback stage being subsequent to the first CSI feedback stage;
after outputting the plurality of feedback contents for transmission, determining an updated feedback content for a first feedback content of the plurality of feedback contents, the first feedback content being associated with the first CSI feedback stage; and outputting the updated feedback content for transmission during a subsequent third CSI feedback stage of the differential CSI feedback report, wherein the updated feedback content output for transmission overrides the first feedback content and overrides a third feedback content associated with the third CSI feedback stage; and a memory coupled to the at least one processor.

21. The apparatus of claim 20, wherein:

the differential CSI feedback report is an aperiodic differential CSI feedback report;

the indication triggers the apparatus to transmit the aperiodic differential CSI feedback report; and reporting differential CSI feedback comprises outputting the aperiodic differential CSI feedback report for transmission in response to the indication.

22. The apparatus of claim 21, wherein the processor is further configured to periodically output one or more non-differential CSI feedback reports for transmission over one or more time periods prior to receiving the configuration.

23. The apparatus of claim 22, wherein at least one feedback content associated with an initial CSI feedback stage of the differential CSI feedback report is overridden by one of the one or more non-differential CSI feedback reports output for transmission in the one or more time periods.

24. The apparatus of claim 20, wherein the processor is further configured to provide an indication of the first CSI feedback stage that corresponds to the updated feedback content.

25. The apparatus of claim 20, wherein the updated feedback content output for transmission further overrides one or more second feedback contents of the plurality of feedback contents output for transmission after the first feedback content.

26. An apparatus for wireless communications, comprising:

at least one processor configured to:
determine a first configuration for a user equipment (UE) to use for reporting differential channel state information (CSI) feedback;

output the first configuration for transmission to the UE, wherein the first configuration comprises at least an indication of when the UE is to report differential CSI feedback, wherein the differential CSI feedback comprises a differential CSI feedback report;

obtain a plurality of feedback contents associated with at least one of a first CSI feedback stage or a second CSI feedback stage of the differential CSI feedback report, the second CSI feedback stage being subsequent to the first CSI feedback stage;

after obtaining the plurality of feedback contents, obtain an updated feedback content for a first feedback content of the plurality of feedback contents during a subsequent third CSI feedback stage of the differential CSI feedback report, the first feedback content being associated with the first CSI feedback stage and overriding a third feedback content associated with the third CSI feedback stage;

override the first feedback content with the updated feedback content; and determine a precoding to use for multiple input multiple output (MIMO) communications based in part on the updated feedback content; and a memory coupled to the at least one processor.

27. The apparatus of claim 26, wherein the indication triggers the UE to periodically transmit the differential CSI feedback report over one or more time periods.

28. The apparatus of claim 26, wherein the updated feedback content further comprises an indication of the first feedback content that corresponds to the updated feedback content.

* * * * *